Feb. 8, 1966 R. H. PARK 3,234,397
MEANS FOR MAINTAINING STABILITY OF POWER TRANSMISSION
SYSTEMS NOTWITHSTANDING A FAULT
Filed Aug. 27, 1962 19 Sheets-Sheet 1

*INVENTOR.*
ROBERT H. PARK

Feb. 8, 1966    R. H. PARK    3,234,397
MEANS FOR MAINTAINING STABILITY OF POWER TRANSMISSION
SYSTEMS NOTWITHSTANDING A FAULT
Filed Aug. 27, 1962    19 Sheets-Sheet 2

*INVENTOR.*
ROBERT H. PARK

*INVENTOR.*
ROBERT H. PARK

Feb. 8, 1966  R. H. PARK  3,234,397
MEANS FOR MAINTAINING STABILITY OF POWER TRANSMISSION
SYSTEMS NOTWITHSTANDING A FAULT
Filed Aug. 27, 1962  19 Sheets-Sheet 4

Inventor:
Robert H. Park.
by Kenway, Jenney &
Hildreth

INVENTOR
ROBERT H. PARK

Feb. 8, 1966 R. H. PARK 3,234,397
MEANS FOR MAINTAINING STABILITY OF POWER TRANSMISSION
SYSTEMS NOTWITHSTANDING A FAULT
Filed Aug. 27, 1962 19 Sheets-Sheet 6

Inventor:
Robert H. Park,
by Kenway, Jenney &
Hildreth

Inventor:
Robert H. Park.

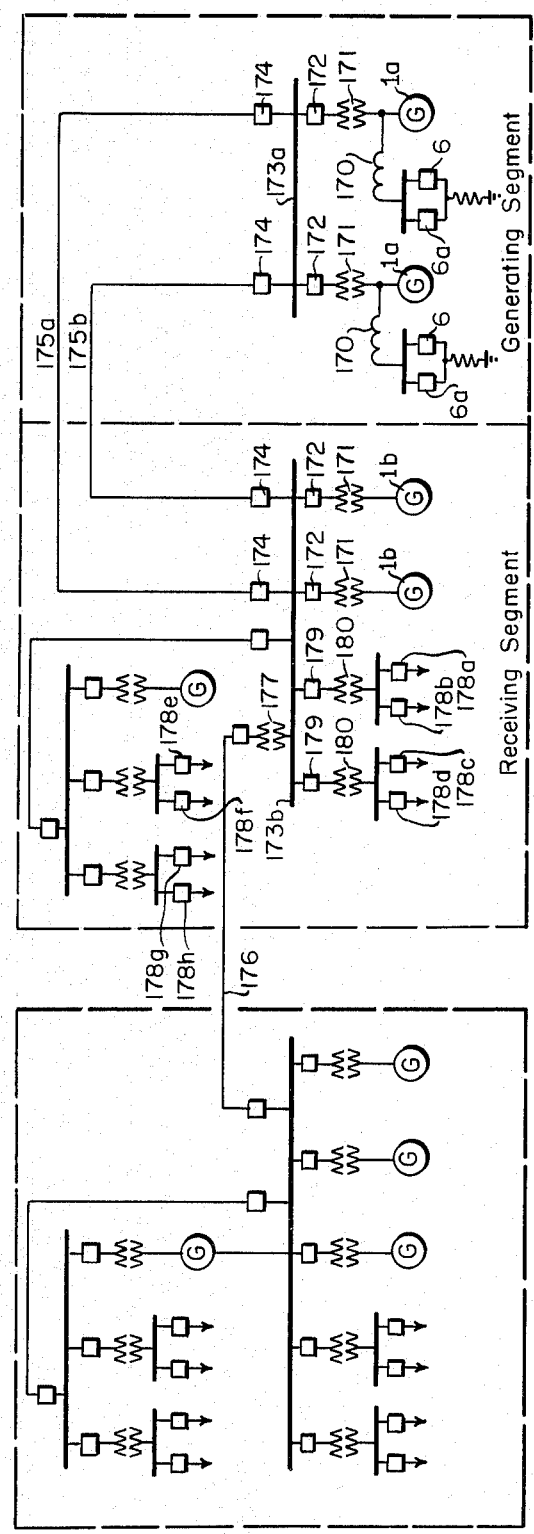
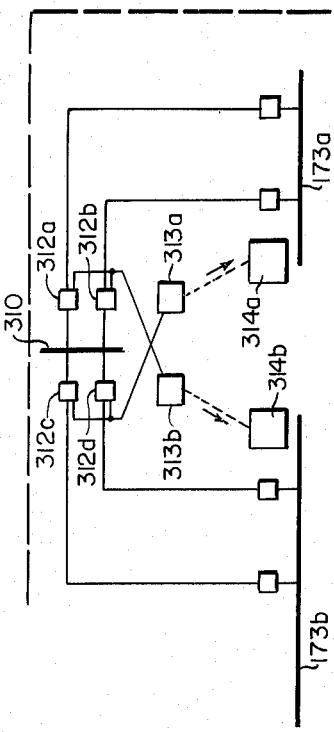
FIG. 22
FIG. 28
INVENTOR.
ROBERT H. PARK
BY
*Kenway, Jenney & Hildreth*
ATTORNEYS

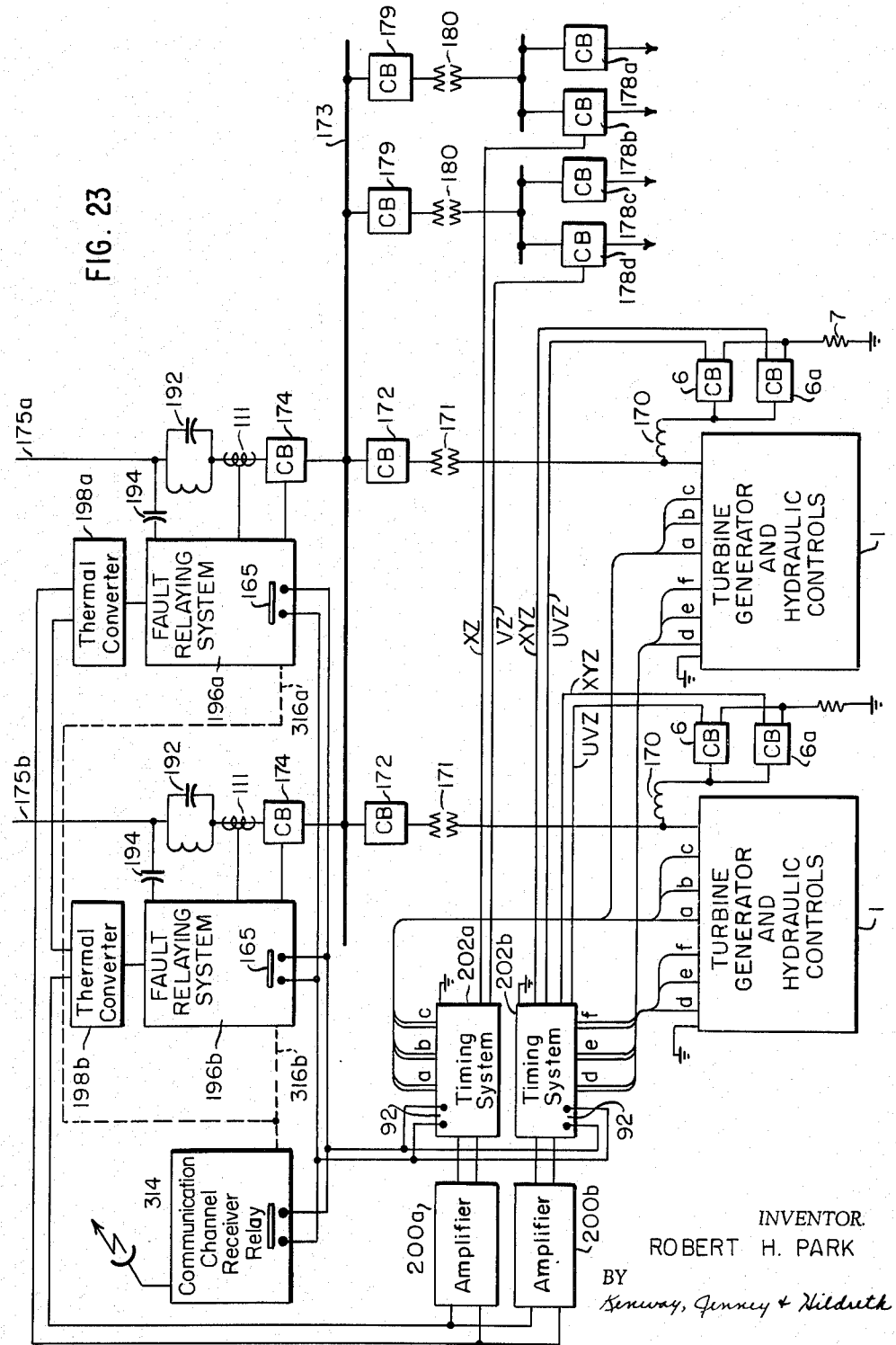

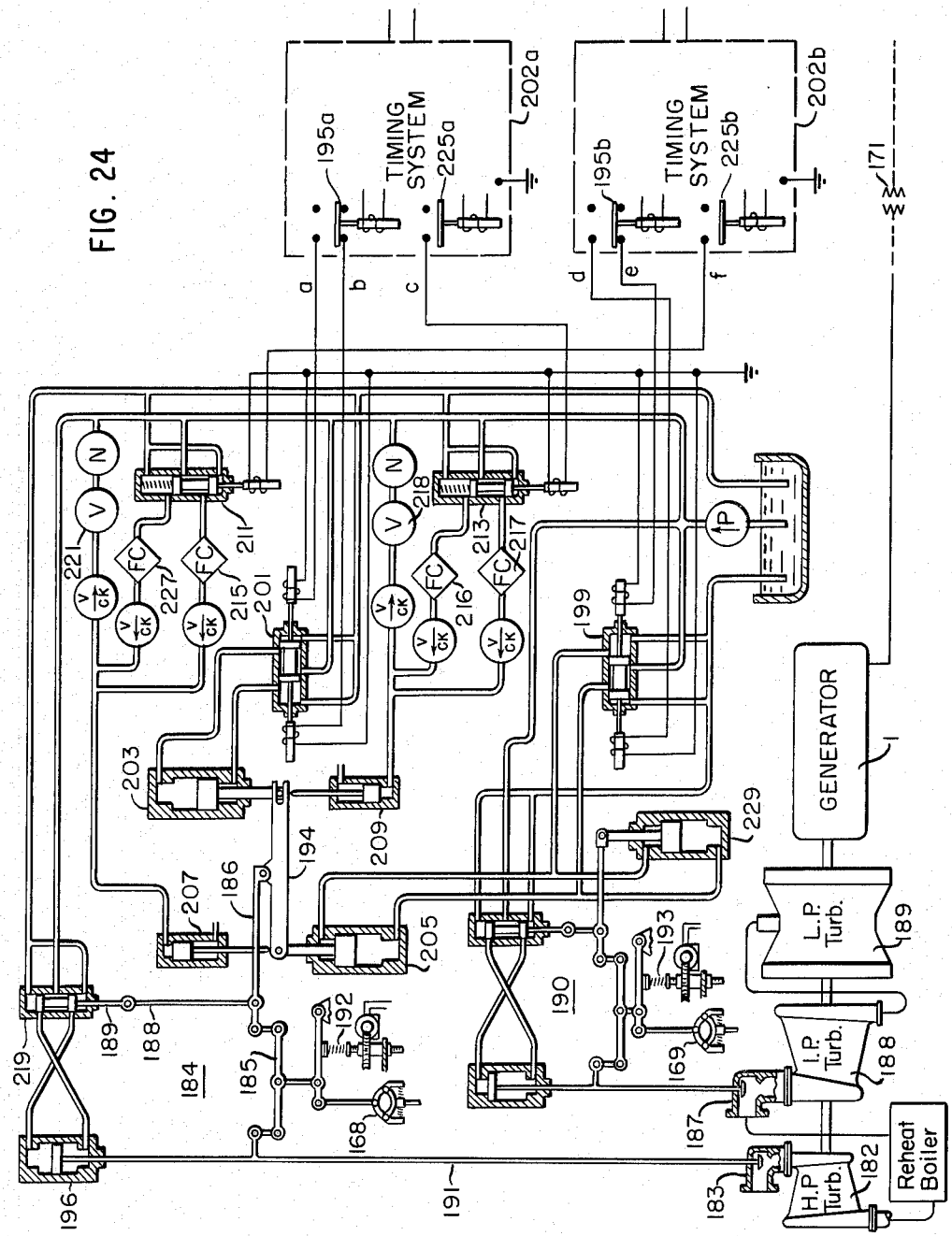

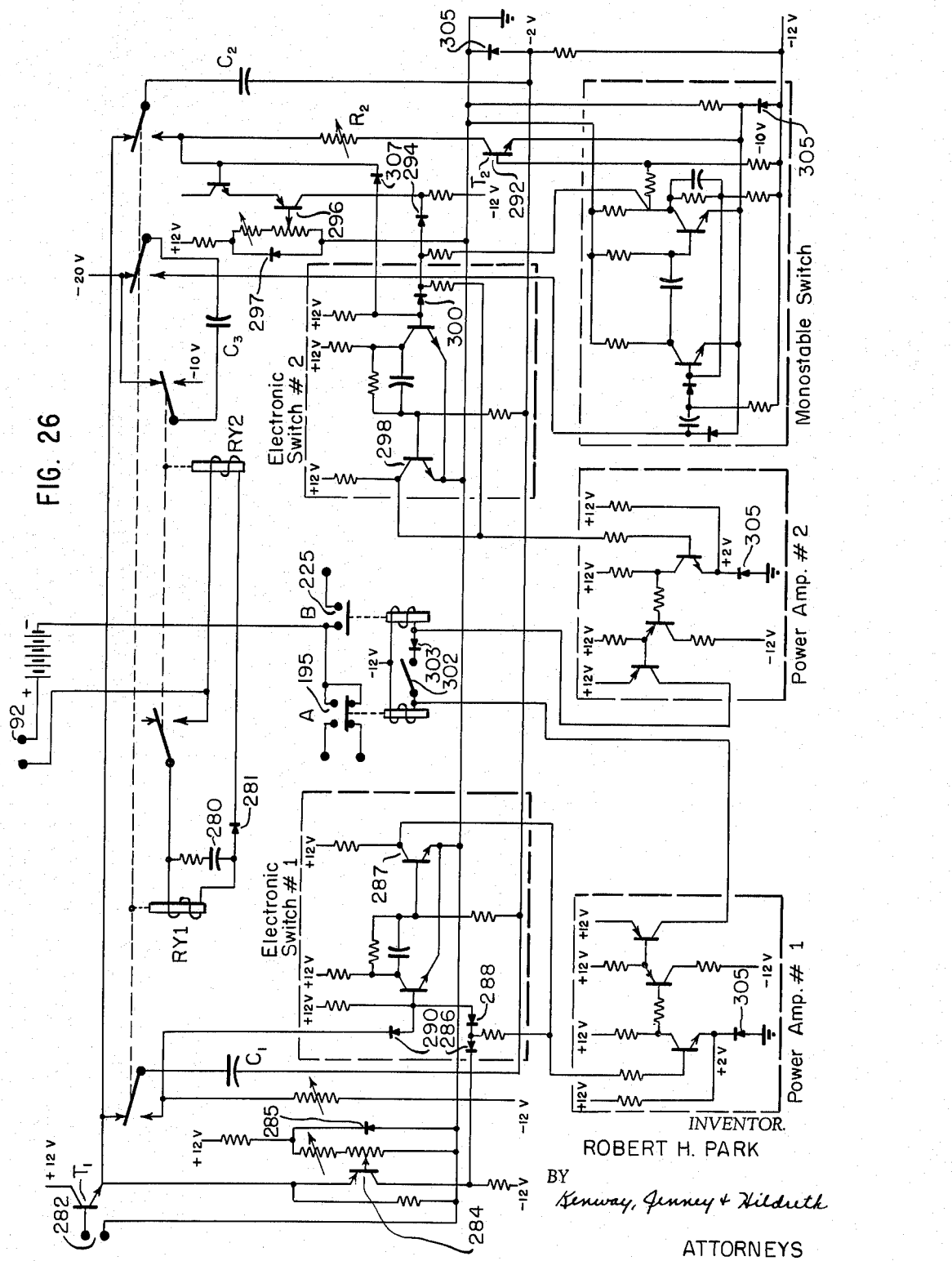

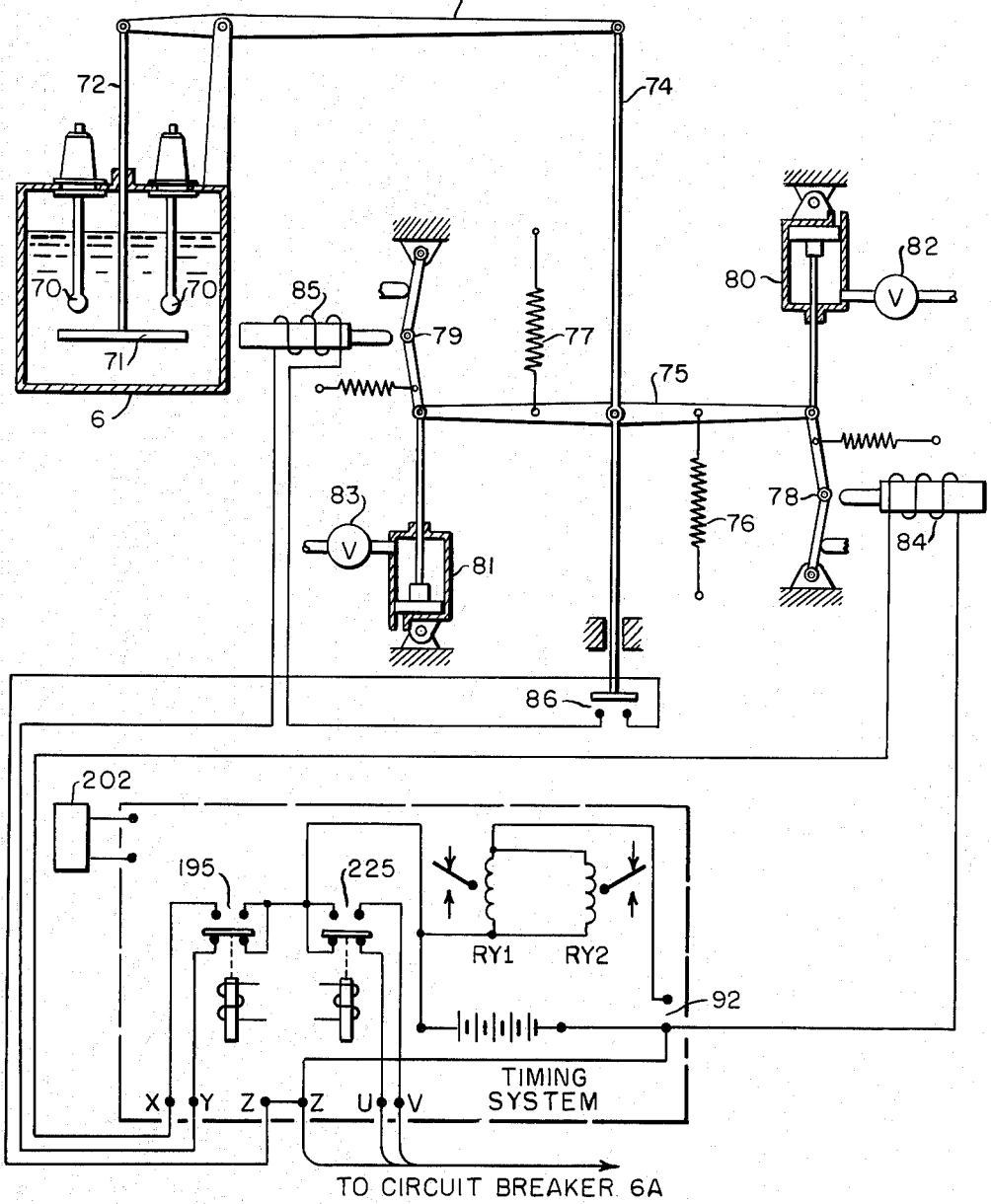

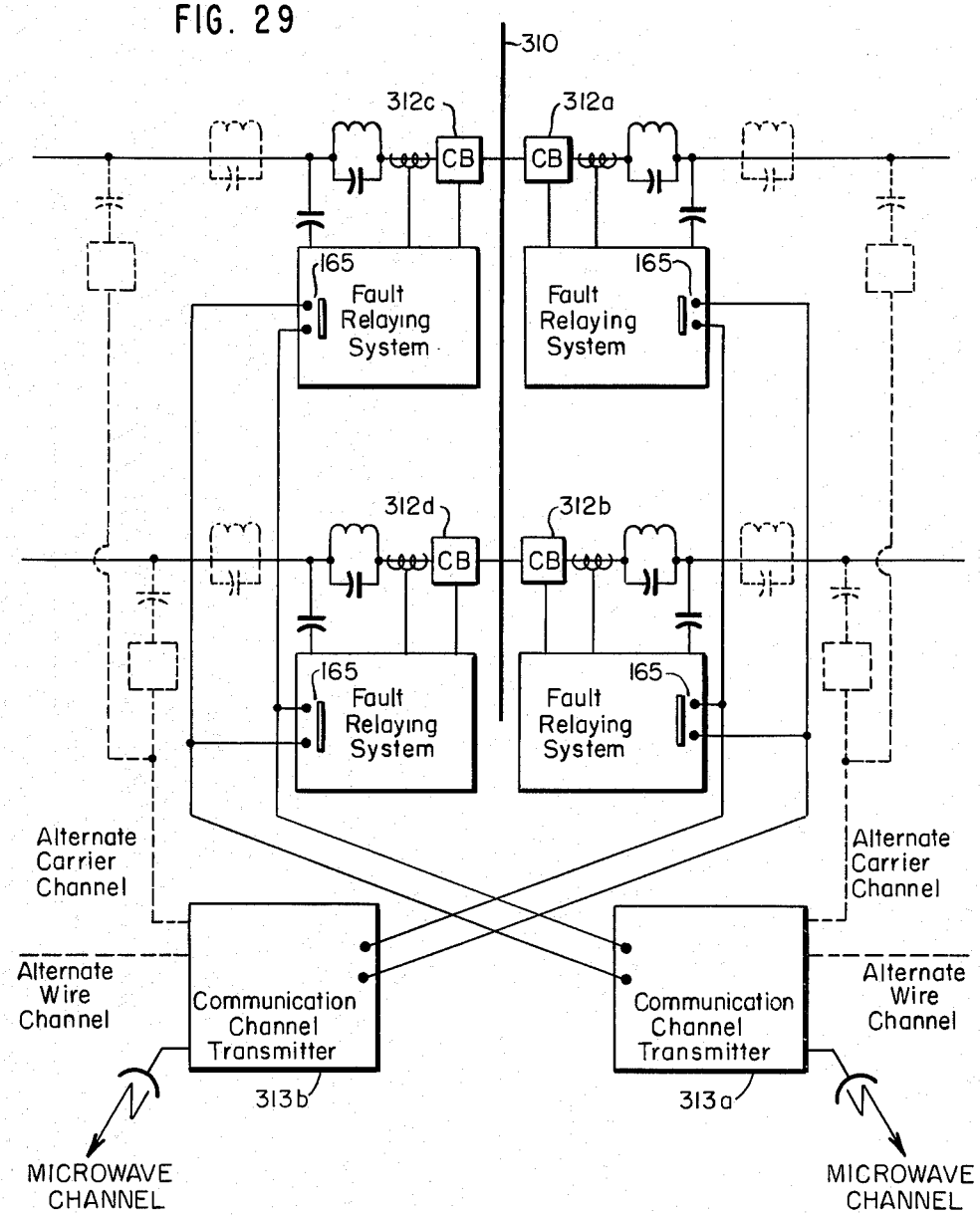

United States Patent Office 3,234,397
Patented Feb. 8, 1966

3,234,397
MEANS FOR MAINTAINING STABILITY OF POWER TRANSMISSION SYSTEMS NOTWITHSTANDING A FAULT
Robert H. Park, Dennis, Mass.
Filed Aug. 27, 1962, Ser. No. 219,711
27 Claims. (Cl. 307—86)

This application is a continuation-in-part of application Serial No. 63,393, filed October 19, 1960, now Patent No. 3,051,842, which application is a continuation-in-part of application Serial No. 848,489, filed October 13, 1959, now abandoned, which application is a continuation-in-part of application Serial No. 769,055, filed October 21, 1958, now abandoned, which application is a continuation-in-part of application Serial No. 582,589, filed May 3, 1956, now abandoned.

This invention relates to power transmission systems and has for its object the provision of reliable and efficient means for maintaining the electrical stability of such systems subsequent to the occurrence of faults on the lines resulting from insulator flashovers due to lightning, or other causes of a temporary nature.

In power transmission systems a short circuit fault on a line normally operates circuit breakers at each end of the line thereby to isolate the fault, while further after a preset period, chosen long enough normally to extinguish an arc, the breakers may be reclosed automatically.

During the period prior to the opening of the breakers there is a relative acceleration between those synchronous machines within the system which are adjacent to the end of the line that was supplying power prior to the fault and those adjacent to the other end of the line, the relative acceleration being such as to increase the relative angular displacement.

This tendency, moreover, ordinarily continues after the circuit breakers have opened, especially if the line in question represents the sole tie between a generating plant and a receiving system or between two otherwise isolated systems or segments of systems. In this connection, it should be noted that in modern power systems it is common for the receiving segment to include generators as well as loads. Conversely, it is common for the generating segment also to include loads as well as generators. The term "system," as used in the present application, will normally apply where both generating capacity and power-consuming receivers are contemplated in both the generating segment and the receiving segment, although either the generating segment or the receiving segment may, respectively, include only generators and only loads under certain circumstances. The various combinations and permutations to which the invention is applicable are explained in greater detail hereinbelow.

The effect of such acceleration at one end and of deceleration at the other end is to produce a difference in the velocities and an increase in the relative phase angle between the group of machines adjacent one end of the line, and the group of machines adjacent the other end of the line, with a resultant tendency to loss of synchronism and instability causing voltage disturbances which operate to affect adversely the performance of connected equipment throughout the system.

Accordingly, it is an object of my invention to reduce to a minimum such differences in velocities and increases in phase angle.

According to known techniques, design of power transmission systems has been based mainly on the practices of utilizing two or more parallel lines, interconnecting generators in generating stations, either through low or high voltage busses, connecting parallel lines together at both ends, and also, in the case of long lines, through one or more sectionalizing busses located at intermediate points between the ends and providing high speed switches and relaying adapted to rapidly open the switches at either end of a line or section of line that has become faulted thereby to isolate the fault, while also it is often the practice to reclose the same breakers after a short interval during which the arc at the point of fault may be expected to have become extinguished.

Published theoretical studies have been carried out relative to the advantages which can be realized through use of relaying and circuit breakers adapted to rapidly open the breakers at both ends of a single transmission line connecting generators in a generating station to a load center thereby decoupling the generating station from the load center, and then, after a brief interval, reclosing these breakers.

These studies have shown that, in this single line case, use of the principle of rapid reclosing will often result in instability, when the load on the generators exceeds a critical value less than full load, even when the highest practicable speed of reclosing is utilized.

One phase of my invention relates to the procedure in conjunction with such single line transmission and automatic reclosing, of, in the event of a line fault, promptly isolating the fault and applying a resistive braking load to the generator or generators feeding the line, and disconnecting this load, preferably at or about the time that the line breakers reclose, and constitutes an improvement over procedures heretofore described.

In another phase of this form of my invention, means are employed whereby the driving force applied to the moving element of the generator prime mover or prime movers is rapidly reduced on the occurrence of a line fault and thereafter rapidly restored at or about the time the line breakers reclose.

Another object of my invention is to make practicable the use of single line in place of double line transmission systems, with a resultant saving in capital cost.

Another object of my invention is to allow use of longer and lower voltage single line transmission systems than would otherwise be practicable.

Another object of my invention is to allow full generating station power transmission over one of two parallel lines without danger of instability in the event of a line fault when the other line is out of service due to need for repairs or for other reason.

Another object of my invention is to allow the stable transmission of power generated by two or more generators or groups of generators, over parallel lines, without electrical connection between the generators or groups of generators at the one end of the lines, with concomitant reduction in generator and circuit breaker duty, and in shock to the receiver system in the event of line fault.

Another object of my invention is to insure maintenance of stability of a two parallel line transmission system in the event that faults occur simultaneously on both lines.

A further object of my invention is to provide a means of increasing the transient stability of power systems in which generating plants, or more broadly in which segments of a system containing generating capacity beyond the need of the segment, are tied to the balance of the system by means of either one or a plurality of lines.

In the latter case the invention may provide that not only do breakers operate at each end of the faulted line to isolate the fault, but also that other breakers are simultaneously actuated whereby a generator or generators within a generating plant, or, more broadly, a preselected segment of the complete system supplying power to the balance of the system before the fault, is detached or decoupled and has a braking load of controlled magnitude applied for a preset period, or a braking load of preset magnitude applied for a controlled period, and/or a momentary reduction effected in the driving force applied to the moving elements of the generator prime movers within the segment, after which all of the breakers that had just been opened are automatically reclosed, and wherein either the magnitude or duration of the braking load and/or power output reduction applied is adjusted to be held generally in a predetermined relation to the net load which the generating plant, or more generally, system generating segment was supplying to the balance of the system just prior to the fault.

In this last form of my invention provisions can be made, at the same time, in case of a two parallel line transmission system, so that a braking load will be applied to all of the generators of the generating segment in the event of a simultaneous fault on each of the two lines.

In another aspect of my invention this procedure may be modified so that only the breakers at either end of the faulted line are opened, while provision is made to momentarily apply a braking load of controlled magnitude and/or duration or to effect a momentary reduction of generating segment prime mover driving force, of controlled magnitude and/or duration, the controlled values being made responsive to the net load which the generating segment was suppplying to the balance of the system just prior to the fault, while in still another aspect of my invention the foregoing is supplemented by provision that the fault is caused to effect a sustained modification to the generator prime mover driving force control system whereby it results that following clearance of the fault and return to steady power flow conditions the amount of power transmitted over the transmission system from the generating segment to the receiving segment will be reduced relative to conditions obtaining just prior to the fault.

In another aspect of the last mentioned form of my invention provision made so that the degree of sustained modification of the prime mover driving force control system introduced is controlled automatically in relation to the amount of power being transmitted over the transmission system just prior to the fault.

Still another aspect of my invention has to do with conditions which obtain in the event that a refault occurs when the line circuit breakers are first reclosed. In such case it is a widely used power transmission practice to provide so that the breakers at either end of the affected line reopen and thereafter remain locked open and subject only to manual control.

In this situation all of the previous remedies are applicable, i.e. momentary application of braking load and/or both a momentary and sustained reduction of prime mover driving force, with or without momentary detachment of a generator, generators, or a complete generating segment, and it is an aspect of one form of my invention that subsequent to a transmission line refault, provision is made for the renewed application of these remedies.

In another phase of my invention the extent and/or duration of the momentary application of braking load and/or reduction in prime mover driving force, which takes place after a refault, is made to depend in a controlled manner on the power transmitted over the transmission system just prior to the first fault on the system, while also provision is made so that the nature of the control action may be chosen to be different from that which applies subsequent to a first fault.

In still another phase of my invention the value of the sustained change in prime mover driving force control system setting which is caused to come into effect subsequent to a refault is also controlled in relation to the power being transmitted over the transmission system just prior to the initial fault, while also provision is made so that the nature of the control effected may be chosen to be different from that which applies subsequent to a first fault, in the event that a refault does not occur.

In another phase of my invention account is taken of the fact that either the receiving or generating segment of a first power system in addition to being joined electrically by one or more transmission lines, which we will designate as the primary transmission system, may have electrically weak ties to another power system or systems through other transmission lines which we will designate as secondary lines. In this case it can result that the power that can be transmitted over the secondary line or lines, without resultant loss of synchronism of the systems tied together by such secondary lines, has a value which is low enough that the effects of application to the generating segment of the first system, subsequent to a fault on the primary transmission system, of the features of the invention that have been so far described, are such as to result in the "other system or other systems" losing synchronism with the first system.

In such event the features of the present invention, as so far described would offer some advantage over an arrangement in which braking resistors and/or reduction of prime mover driving force was utilized, but without provision for automatic control of amount or duration of braking action or prime mover driving force reduction, in that with automatic control the magnitude of the deceleration of the first system relative to other systems would decrease as load transmitted over the primary transmission system was reduced.

However, it could still be true that above a predeterminable value of transmitted load the extent of deceleration of the primary system resulting from application of the remedies offered by the invention, as so far described, would be enough to cause loss of synchronism of the first system with the other systems to which it was connected.

Accordingly, in the case in question, and at high values of transmitted load, the value of the remedies offered by the invention, as so far outlined, would be at least partially lost.

To overcome this problem, when it exists, it is a feature of my invention to provide ways of countering the deceleration of the first system, as a whole, which is a concomitant of application of braking load to and/or reduction of driving force of generator prime movers within the generating segment of the first system subsequent to a fault on the primary transmission system.

To accomplish the result desired, it is a feature of my invention to provide so that there is effected promptly after the occurrence of a fault on the primary transmission system, a momentary and/or sustained increase in the driving force of prime movers located within the receiving segment of the system.

In another phase of my invention the same desired result is accomplished in an alternate manner by providing so that in the event of a fault on the primary transmission system, preselected receiving system circuit breakers are automatically and promptly opened at least momentarily whereby to drop selected segments of receiving system load at least momentarily.

In still another phase of my invention I extend the scope to transmission systems involving parallel lines having intermediate busses and provide so that in the event of a line fault, the operative features of the invention will come into effect at both ends of the line transmission system notwithstanding the fact that breaker action will take place only at the end that includes the section of line in which the fault occurs.

In still another phase of my invention I provide so that when a transmission system is arranged to transmit power over a plurality of generally electrically paralleled circuits which vary in impedance, as well as the case of transmission over a plurality of circuits to a plurality of load receiving centers, the magnitude of corrective action taken with a view to improving stability in the event of a fault on any circuit, is made to depend in a preset way in dependence both on the circuit faulted and on the distribution of load on the various circuits.

Other objects and advantages of the invention will become apparent from the following detailed description taken in conjunction with the accompanying drawings, wherein.

Figure 5:
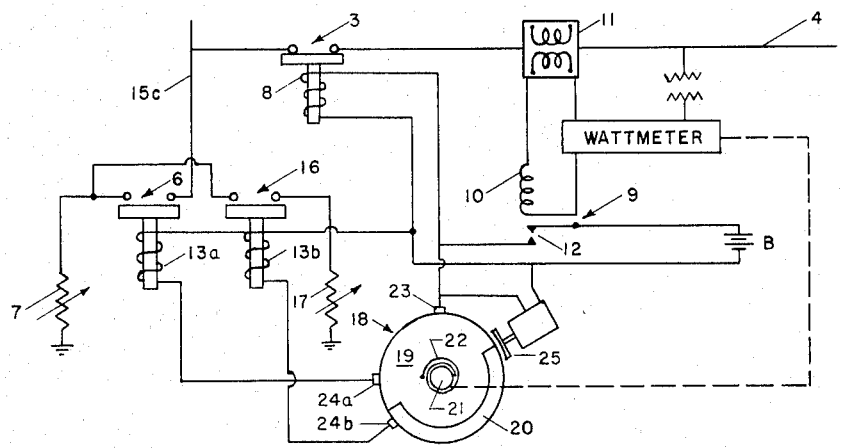
FIG. 5 shows a circuit generator for varying the resistive load to be applied at the time of fault.
Figure 6:
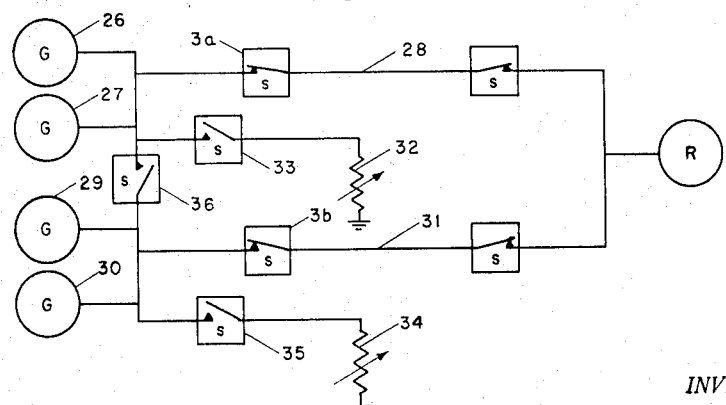
Figure 7:
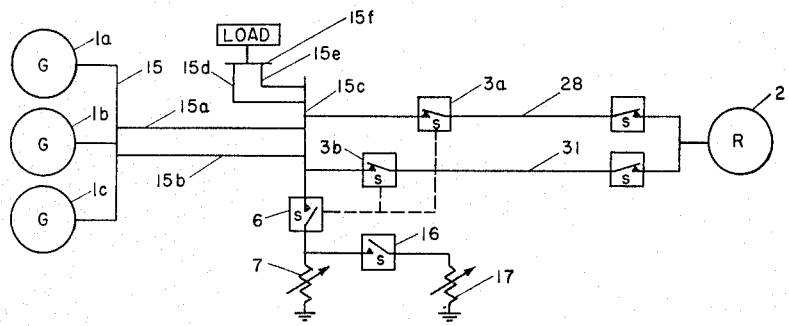
Figure 8:
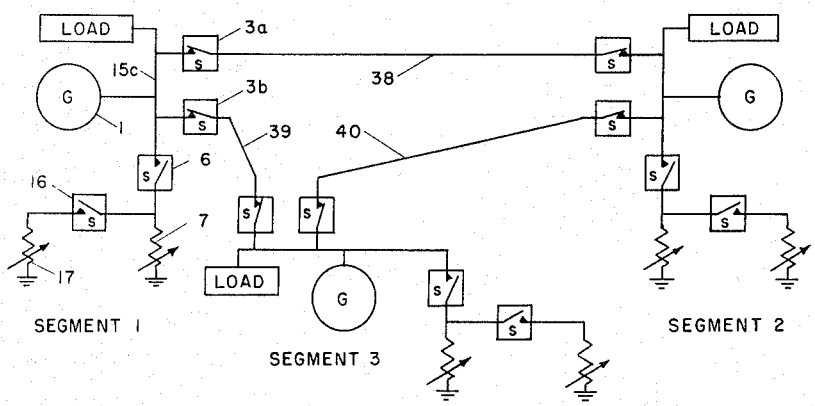
Figure 11:
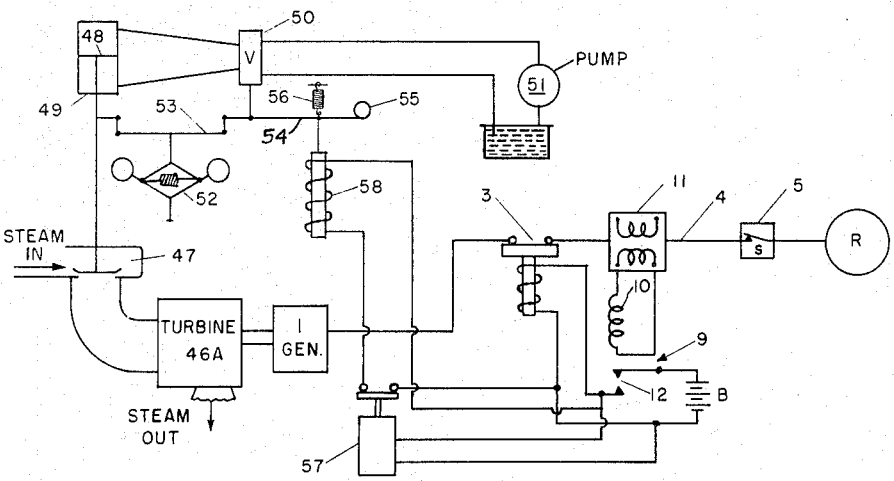
Figure 9:
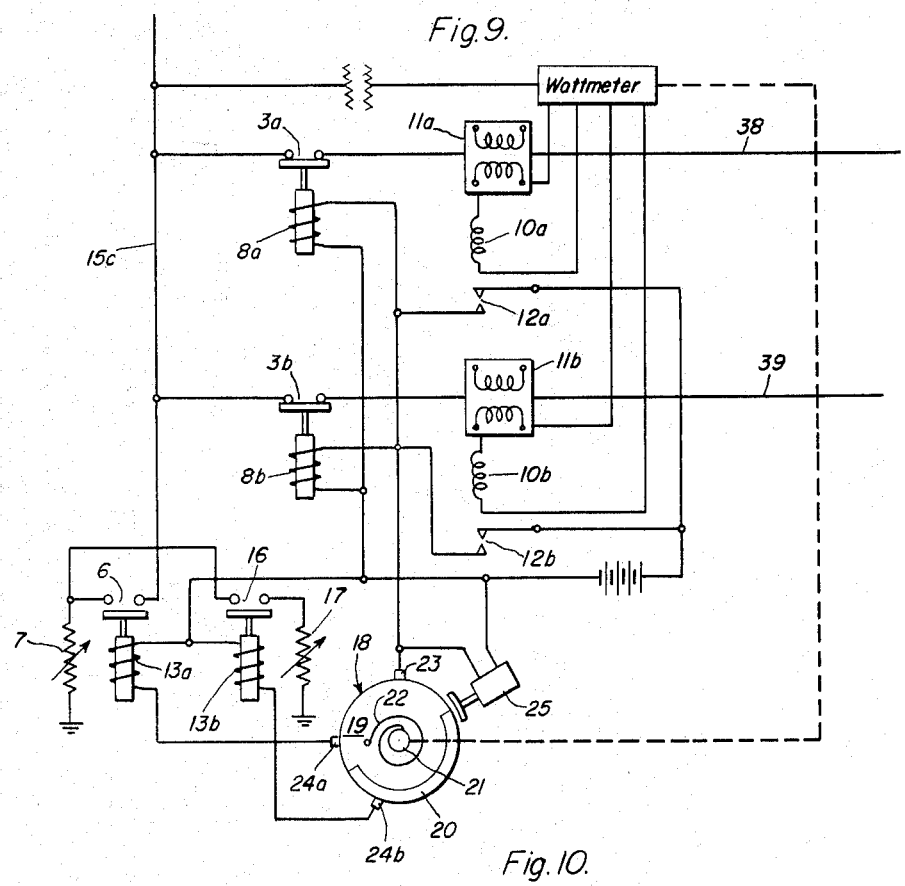
Figure 10:
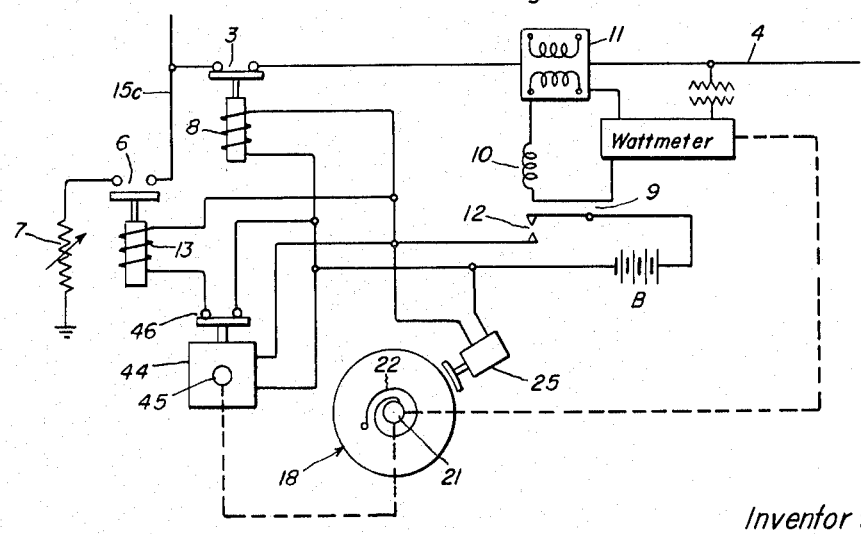
Figure 12:
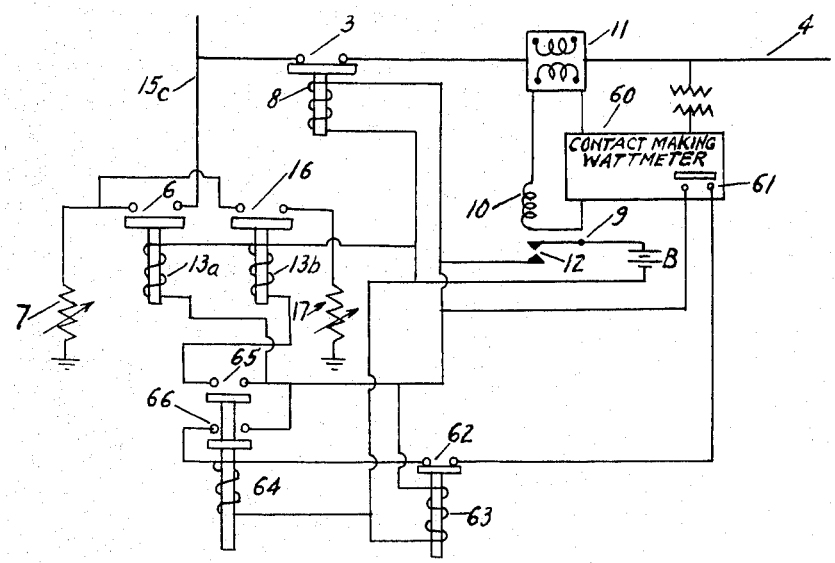
Figure 13:
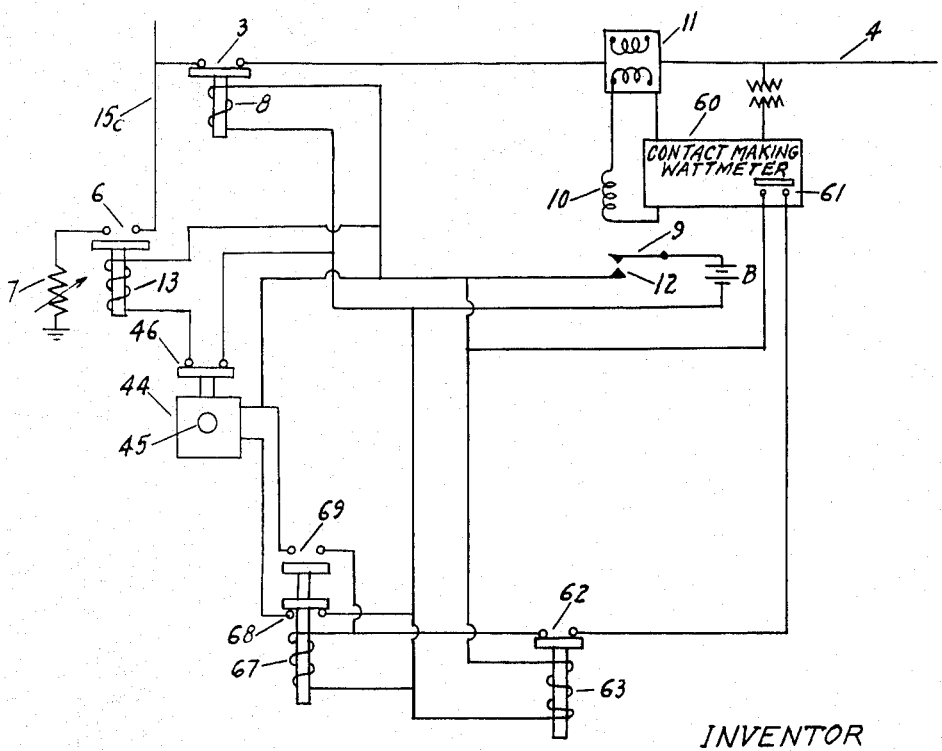
Figure 14:
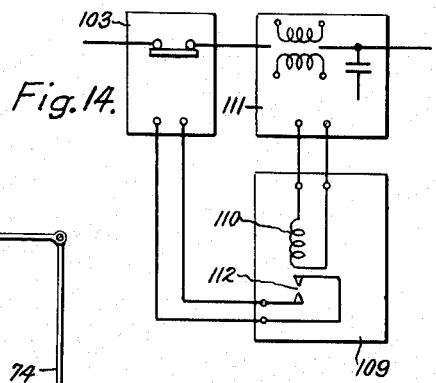
Figure 15:
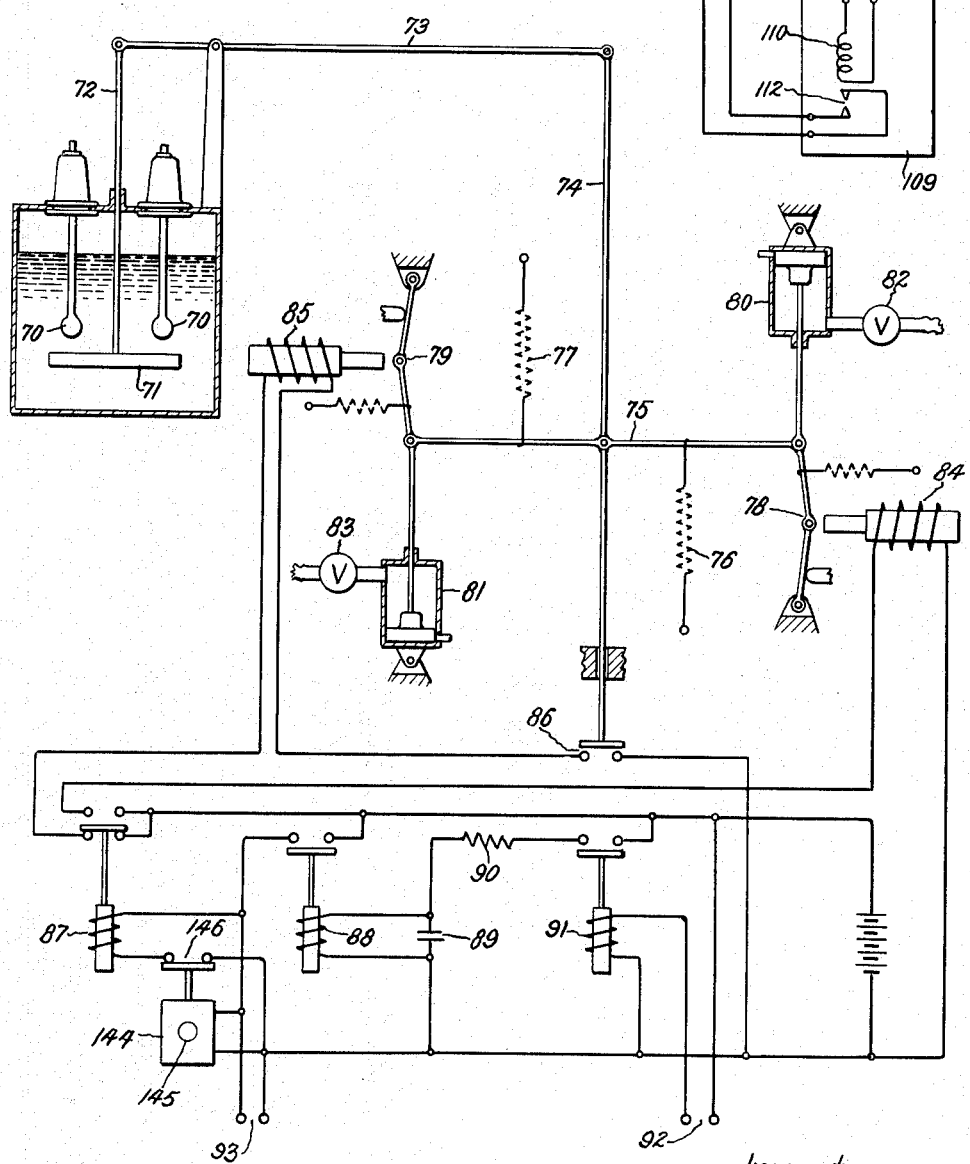
Figure 16:
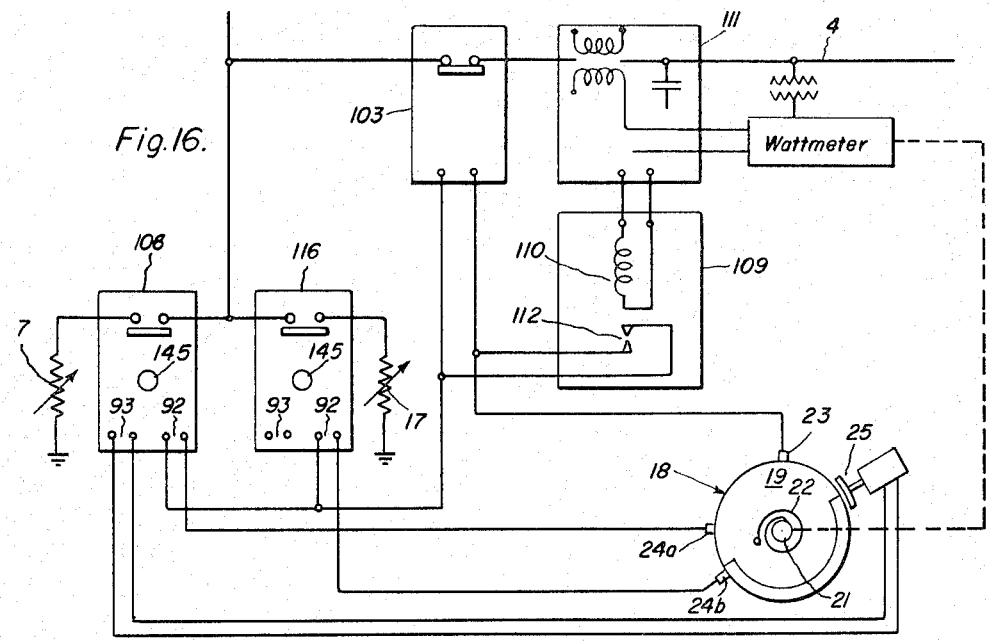
Figure 17:
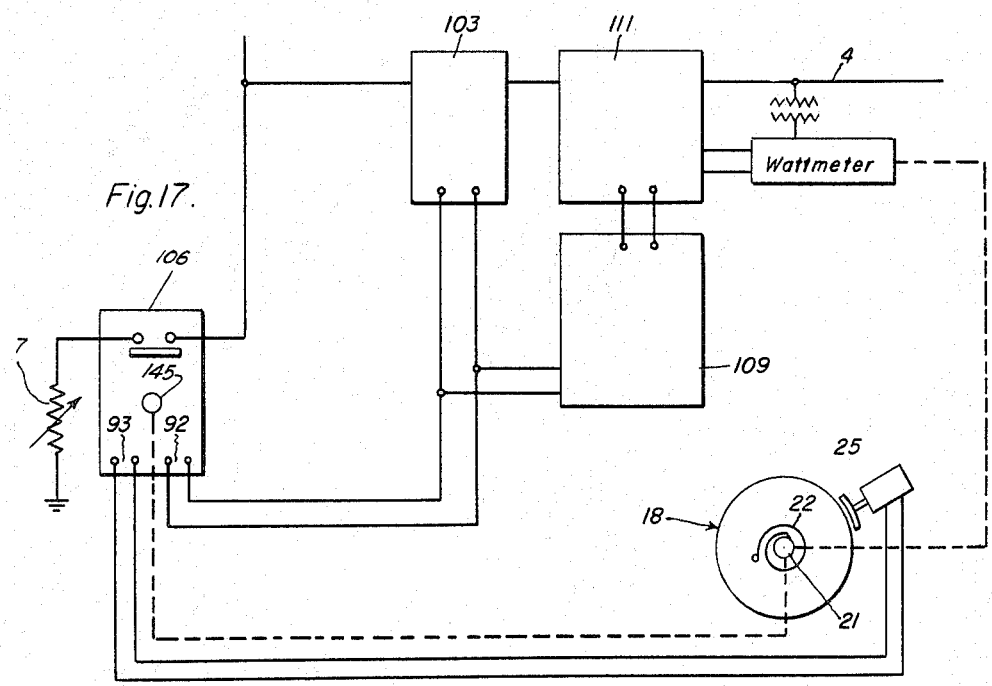
Figure 18:
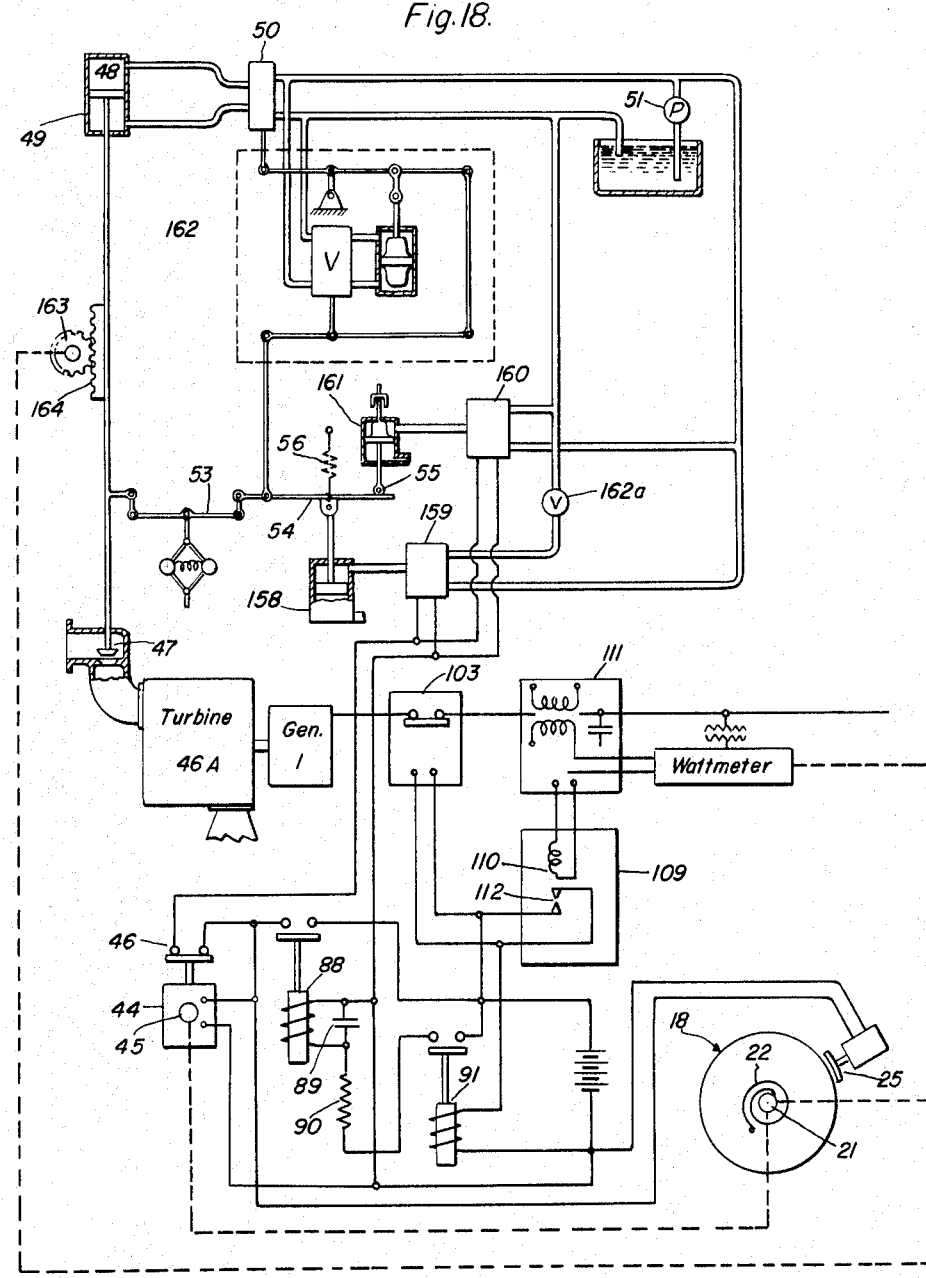
Figure 19:
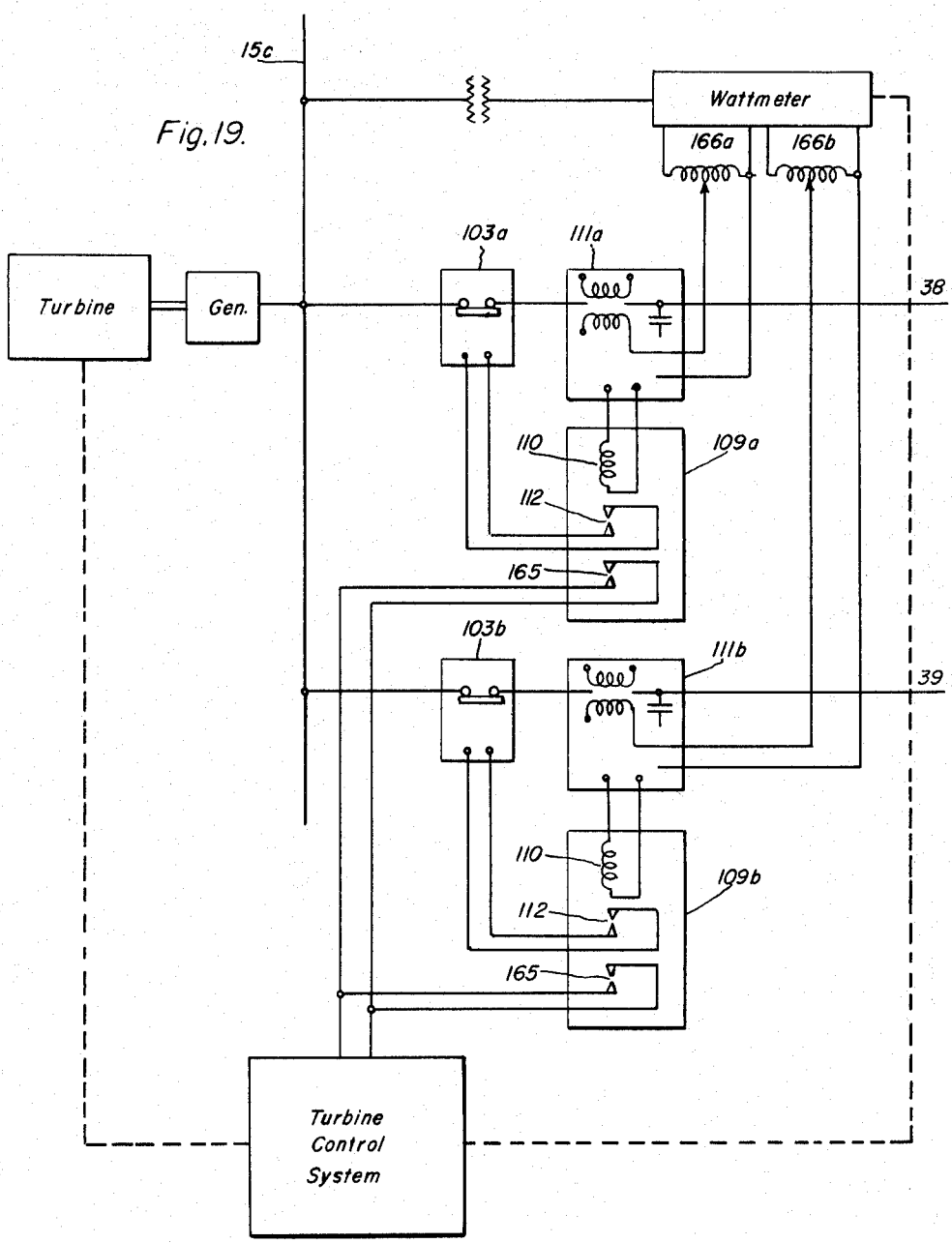
Figure 20:
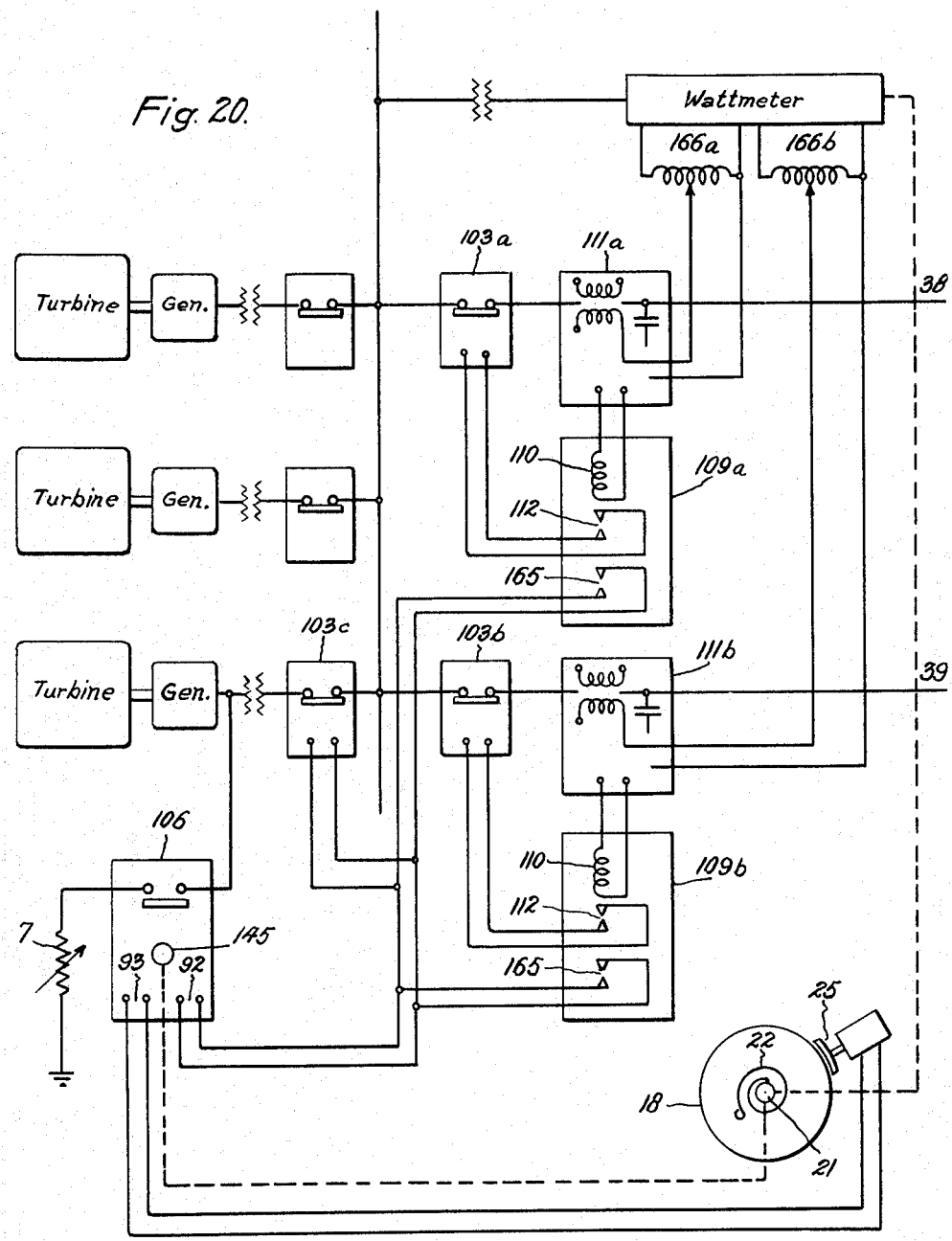
Figure 21:
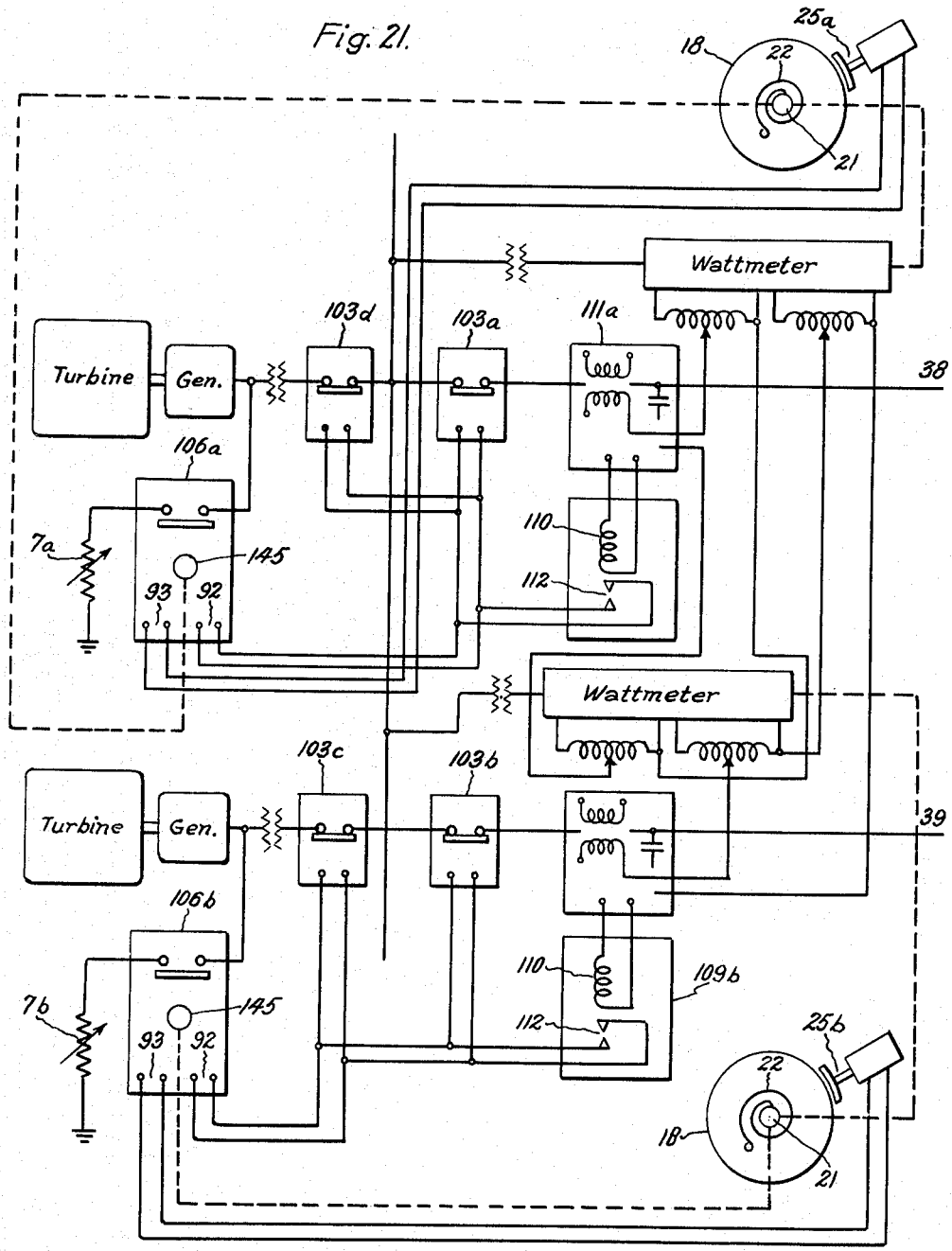
Figure 25:
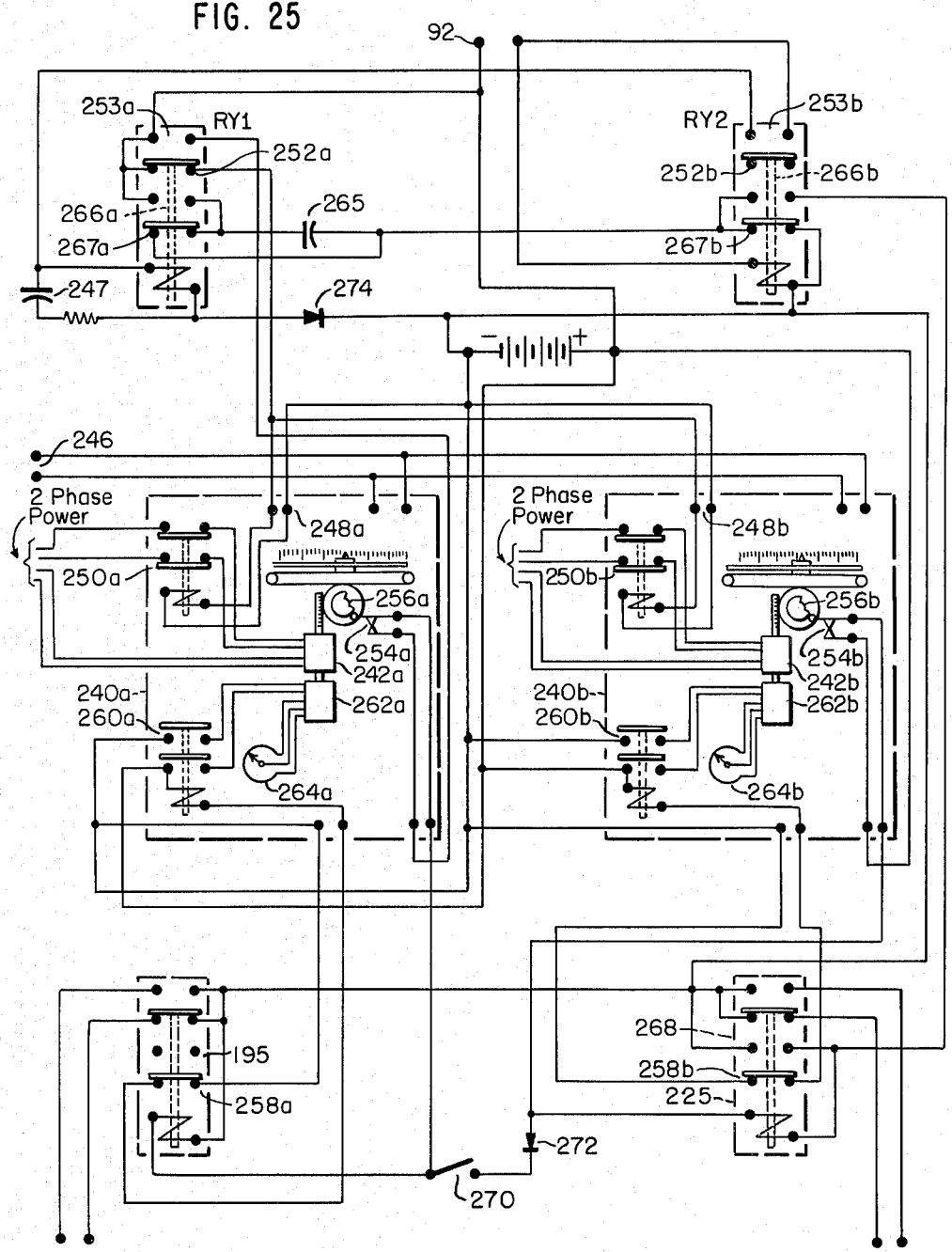

FIG. 6 relates to the invention as applied to a multi-generator power station feeding a pair of parallel lines;

FIG. 7 relates to an embodiment of the invention in which a segment of a power system containing load as well as generating capacity, supplies power to the balance of the system over two parallel lines;

FIG. 8 relates to the invention as applied to a power system in which the flow of power between major segments of a power system takes place over a plurality of non-parallel lines;

FIG. 9 illustrates one means of applying the invention to the system of FIG. 8;

FIGS. 10 and 11 show alternative embodiments of my invention;

FIGS. 12 and 13 show alternative embodiments of FIGS. 5 and 10 respectively, of my invention;

FIG. 14 is a fragmentary simplified diagram of circuit breaker and relay control systems for incorporation in the systems of FIGS. 1 through 13;

FIG. 15 is a simplified diagram of a modified form of resistor load circuit breaker and control system therefor;

FIGS. 16, 17 and 18 show the breaker and control systems of FIGS. 14 and 15 as applied to the systems of FIGS. 5, 10 and 11 respectively;

FIG. 19 is a simplified diagram of automatic control means for the prime mover motive power unit of generators of FIG. 8;

FIG. 20 is a simplified diagram in which provision is shown for momentarily isolating a portion of the normally interconnected generating capacity of a generating segment in the event of a line fault;

FIG. 21 is a simplified diagram which shows a modification of the arrangement of FIG. 20 which provides so that the whole generating segment will be isolated in the event of a fault on both lines of a two parallel line transmission system;

FIG. 22 is a simplified diagram of a power system incorporating a transmission line providing a link between a generating segment and the receiving segment of a first system together with a tie line joining the first system to a second system;

FIG. 23 is a simplified diagram which shows a pair of turbine generators and the terminal equipment of two transmission lines, all connected to a high voltage bus together with control equipment adapted to be used for the performance of the invention at either the generating segment generating station or the receiving segment generating station of system 1 of FIG. 22;

FIG. 24 illustrates the turbine generator and hydraulic control unit portion of the elements shown in FIG. 23;

FIG. 25 illustrates one form of timing system adapted for use in the circuit of FIG. 23;

FIG. 26 illustrates an alternate type of timing system, which is transistorized;

FIG. 27 illustrates that portion of the electrical controls illustrated generally in FIG. 23 which are used to apply a braking load;

FIG. 28 illustrates a power system incorporating a transmission system similar to that shown in FIG. 22, but having a mid or intermediate bus;

FIG. 29 illustrates generally the method of operation of my invention in the case of transmission systems which employ intermediate busses.

Figure 1:
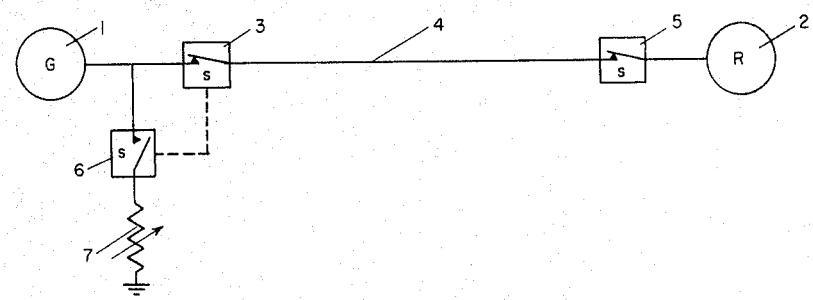
FIG. 1 is a simplified single line diagram of a power transmission system and relates to one embodiment of the invention in which a single generator supplies power to a power system over a single line.

Referring now to FIG. 1, in the prior art relating to employment of braking resistors as system stabilizing means, a generator 1 is coupled to a receiving system 2 via a first reclosing type circuit breaker 3, transmission line 4, and a second reclosing type circuit breaker 5. A branch circuit comprising a resistor 7 and a normally open circuit breaker 6 is coupled to the generator terminals of generator 1. During normal operation, power is transmitted over line 4; however, upon the occurrence of a fault on the line 4, circuit breakers 3 and 5 open thereby isolating the fault and decoupling the generator 1 from the receiving system 2 while circuit breaker 6 closes. The common control of circuit breakers 3 and 6 is shown by a dotted line joining the two circuit breakers.

Figure 2:
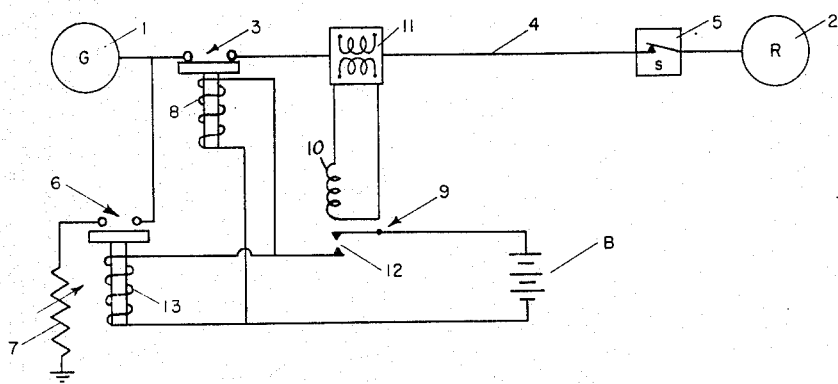
FIG. 2 is a simplified diagram showing one means of operating the control circuits of the circuit breakers of FIG. 1 at the generator end of the line.

The circuit breaker or switch 3 is of the reclosing type and may take any suitable form, one form being schematically indicated in FIG. 2. Circuit breaker 3 incorporates a coil 8 controlled by a relay 9 having a coil 10 and connected in line 4 via a transformer 11 shown symbolically and controlling contacts 12. Breaker 3 is serially connected in the transmission line and is normally closed. The contacts of breaker 6, which are controlled by coil 13, are in the branch circuit and are normally open, as shown. The characteristics of relay 9 are such as to maintain contacts 12 open until an abnormally high current flows in line 4, as will occur on the instance of a fault on the line. Closing of contacts 12 simultaneously energizes coils 8 and 13 through battery B and acts to open breaker 3 and close breaker 6.

After a predetermined time contacts 12 open, whereupon breaker 3 returns to its original closed condition, and preferably although not necessarily breaker 6 is simultaneously opened.

Referring now to the branch circuit, for any predetermined value of transmitted load prior to the fault, a value of the resistor 7 can be determined mathematically by established methods of calculation or by trial, so that when it is coupled to the generator, the generator will tend to decelerate at substantially the same rate as the decoupled receiving system. It then follows that if the value of resistor 7 is so determined, when breaker 3 recloses, the generator and receiving system will have approximately the same velocity and will be at approximately the same relative phase angle as existed prior to the fault; therefore, the stability of the system would not be adversely affected by the transient fault on the line.

Thus, for the sake of simplicity, neglecting line resistance, and the effects of conditions obtaining during the fault prior to the opening of the breaker 3, as well as governor action, the value of the resistive load required to cause the generator to decelerate at the same rate as the receiving system may be determined as follows:

Assuming $P$=power transimitted prior to the fault
$Q$=value of resistive load developed by resistor 7
$M_g$=generator inertia constant
$M_r$=receiving system inertia constant The rate of deceleration of the generator after a fault on the line is equal to $$\frac{Q-P}{M_g}$$

The rate of deceleration of the receiving system is equal to $$\frac{P}{M_r}$$

Hence, the generator and receiver will decelerate equally when $$\frac{Q-P}{M_g} = \frac{P}{M_r}$$

and solving for Q, $$Q = P\left(1 + \frac{M_g}{M_r}\right)$$

In practice, the ideal condition of zero relative phase displacement and velocity difference at the instant of reclosing will not be obtained with the above computed value of Q because there is a time lapse between the time of fault and the time that the circuit breaker 3 opens and circuit breaker 6 closes, and because of the effects of line losses and power loss in the fault. The effect of these factors can be compensated for by using a resistor 7, developing a load differing slightly from and generally greater than the above computed value. An improved value of optimum power demand can be determined for any assumed type of fault by means of appropriate calculations using known methods.

Actually, when resistor 7 is coupled to generator 1, the current flowing will not be constant but will, rather, vary in dependence on a variety of factors including the past effect of the current supplied to the fault, prior to the opening of breaker 3, the effect of voltage regulator action, and the fact that the value and power factor of the resistive load applied by the resistor will in general differ from the generator load prior to the fault.

This means that in practice the closing of breaker 6 will not act to apply a constant value of braking load. However, for any assumed fault condition the foregoing factors can be allowed for in calculation, using established methods, to choose an optimum value of resistor 7 in relation to any value and power factor of load prior to fault.

Alternatively, a desirable value of resistance may be determined on the basis of test results using approximate calculations as a guide.

In some cases it is satisfactory that resistor 7 have a fixed value. In such case the value of resistor 7 should be chosen with a view to preventing instability of the system at any load from zero to that corresponding to normal maximum transmitted load, which implies that it may be considered to be chosen to minimize the phase displacement and velocity difference of the generator and system on reclosing, for the case when the transmitted load prior to the fault has a value $P_0$ less than normal maximum transmitted load.

Under these conditions a fault occurring at a transmitted load substantially greater than $P_0$ will, prior to reclosure, cause the generator to both advance in phase and increase in velocity relative to the system, whereas a fault occurring at a load substantially less than $P_0$ will cause the generator to both retard in phase and decrease in relative velocity.

In numerous cases, depending primarily on the preset time of reclosure utilized, the inertia constants of the generator and system, and the synchronizing power of the line, and optimum value of $P_0$ and a related value of resistor 7 can be found which will insure an adequate margin of stability of the overall system at any load prior to fault from zero up to the full capacity of the generator prime mover.

In the case of multi-generator power systems, the value of resistor 7 may advantageously be varied in relation to the number of connected generators in the generating segment, as well as in relation to the connected capacity in the receiving system, desirable resistance values being determinable by established means of calculation or by trial.

Figure 3:
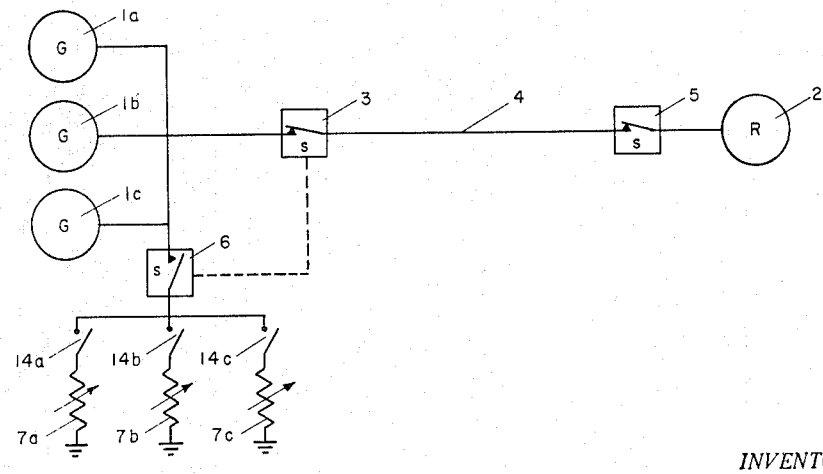
FIG. 3 is a simplified diagram which relates to another embodiment of the invention in which a plurality of generators supply power to a power system over a single line.

FIG. 3 shows how this can be accomplished by providing a series of resistors 7a, 7b, 7c and in the simplest case manually operated or controlled switches 14a, 14b and 14c. Thus, the size of the resistor 7 can be adjusted manually as load conditions vary.

Whereas the foregoing procedures may be used effectively in non-critical applications, in general it is desirable that the value of the load resistor 7 be varied in dependence on the transmitted load prior to fault.

This may be accomplished most simply by inserting a switch in series with coil 13 of FIG. 2 and opening this switch at generator loads below a preset value and closing it at generator loads above this value, while at the same time reducing the value of resistor 7 so as to increase the value of resistive load that it develops to a value such that the shock to the system at any load tends to be a minimum.

As a further step, two braking resistors and associated breakers may be provided, both breakers being held open at low values of transmitted load, one being closed at intermediate values of load and both being closed in the high ranges of load.

Similarly, more than two resistive loads and associated breakers may be employed.

Although the control of the number of breakers held ready to close, in relation to transmitted load, can be accomplished manually, it will normally be advantageous to utilize automatic control means and it is one object of the present invention to provide effective means for such control.

Figure 4:
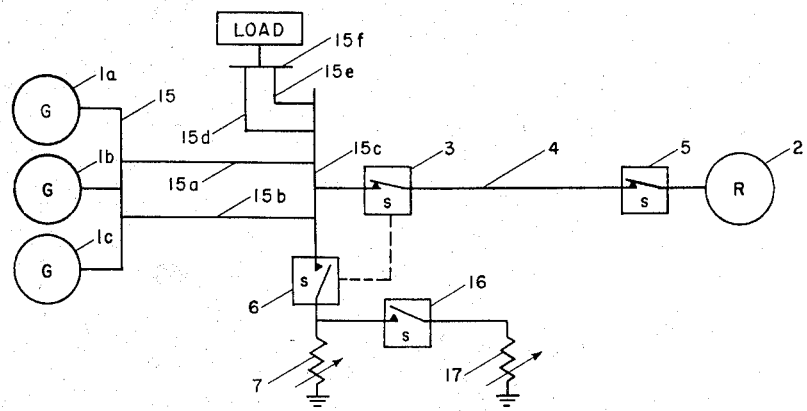
FIG. 4 is a simplified diagram which relates to another embodiment of the invention in which a segment of a power system containing load as well as generating capacity supplies power to the balance of the system over a single line.

Thus referring to FIGS. 4 and 5, a circuit incorporating one such automatic means (FIG. 5) is illustrated for the system shown in FIG. 4. The system comprises a generating segment having three generators 1a, 1b, 1c which are bussed together by bus 15 and supply power over two lines 15a and 15b. The lines 15a and 15b are bussed together by bus 15c and connections are made from the various loads to the bus 15c.

The generating segment and the two parallel lines 15a and 15b to bus 15 and the two parallel lines 15d and 15e from bus 15c to the load bus 15f, and the load, which may be an industrial and/or residential load, all taken together comprise a segment of the total power system, and the line 4 and the receiving system 2 comprise the balance of the system, the receiving system 2 normally containing within it generating capacity as well as diversified load of all types.

Coupled to the bus 15c, are two braking resistors 7 and 17 utilized in association with two breakers 6 and 16.

Resistors 7 and 17 are variable and subject to manual control, as in FIG. 3, in order to allow adjustment for system connected generating capacity conditions.

In FIG. 5 there is illustrated one means for automatically varying the braking load in correspondence with the transmitted load. The automatically varying load means comprises a commutator 18 which is preferably in the form of a disc or drum, and consists of a conducting segment 19, and a non-conducting segment 20. The commutator is rotatably mounted on a shaft 21 and is driven over a coil spring 22 which is chosen with sufficient stiffness to normally drive commutator 18 without significant torsional deflections.

The commutator 18 acts through brushes 23, 24a and 24b to selectively couple coils 13a and 13b controlling the circuit breakers 6 and 16, to contacts 12, whereby upon contacts 12 being operated, a predetermined resistance is coupled to the bus 15c.

As shown in FIGS. 4 and 5, breaker 6 is in series with breaker 16. However, this feature is optional and a parallel connection may be used. The advantage of the series arrangement shown is that in FIG. 5 if breaker 16 is made to close slightly faster than, and is made to open slightly slower than breaker 6, the duty on breaker 16 is reduced, thereby allowing use of a less expensive breaker for 16 than would otherwise be required.

The number of resistors which should be coupled to the bus 15c is determined by the transmitted load; therefore, rotation of the shaft 21 is controlled (shown by dotted line) by a power operated wattmeter (of a type such as is commercially available and in wide commercial use) having sufficient speed of response to follow the rate of movement of prime mover valve gear, and thereby take account of any rapid load changes due to governor action which might be taking place just prior to a line fault.

A magnetic brake 25 locks commutator 18 in position when contacts 12 are closed.

Application to the circuits of FIGS. 1 to 3 would be similar to the arrangement of FIG. 5.

FIG. 6 relates to application of the invention to multiple transmission lines. In this figure, generators 26, 27 feed transmission line 28, and generators 29, 30 feed transmission line 31. Resistive load 32 is coupled to the generators 26, 27, respectively, over normally open switch 33, and resistive load 34 is coupled to the generators 29, 30 respectively, over normally open switch 35. In one method of operation bus tie breaker 36 is held open so that the two halves of the system are isolated at the generator end of the line. Thus, a failure on line 28 will result in the application of resistive load 32 to the generators 26 and 27, but will have no effect on the generators 29, 30.

In another method of operation, bus tie breaker 36 is held closed and the control circuits of the breakers 3a and 3b are paralleled, so that a fault on either line opens the breakers of both lines.

This latter procedure would be necessarily used in a circuit like that of FIG. 7 since splitting the part of the system to the left of lines 28 and 31 into two isolated segments would normally be undesirable.

In FIG. 6, when the bus tie breaker is closed, and in FIG. 7, the value of the load resistor may be made to depend on the transmitted load by use of the circuit of FIG. 5 except with the wattmeter connected to total the power supplied over both lines 28 and 31. Such parallel connection is required, similarly, with the circuit of FIG. 8, which shows three segments of a complete power system interconnected by three tie lines 38, 39 and 40.

FIG. 9 illustrates this form of the invention by way of example in application to segment 1 of the transmission system of FIG. 8.

As shown in FIG. 9, a wattmeter responsive to the net power output of segment 1, operates through circuits similar to the circuit of FIG. 5 to control the connection of braking resistors 7 and 17 to segment 1 tie line bus 15c, in the event of a fault on either line 38 or 39, and also to simultaneously open the segment 1 breaker on the unfaulted tie line. Similar parts in FIG. 9 which are used in addition to the parts illustrated in FIG. 5 have been identified by reference letters following the numbers used in FIG. 5. For example, in FIG. 5 the transformer was identified by number 11; in FIG. 9 where two transformers are required they have been identified by characters 11a and 11b.

Although I have illustrated the line circuits by a single line, the latter will normally be a three phase circuit, the breaker controlling all of the line phases.

Alternatively, provision of an arrangement in which the period of application of a fixed braking load is varied in dependence on load transmitted prior to fault can be employed as a substitute for a means of varying the magnitude of the applied braking load in dependence on transmitted load prior to fault.

Such an arrangement is shown in FIG. 10 wherein 44 represents a variable time delay relay incorporating an emergent shaft 45, the relay being so constructed that rotation of the shaft 45 varies the relay time setting, and drive means, not shown, which may be of the variable ratio type connected to disc 18 over shaft 21, the effect being that the time that breaker 6 is held shut is least at light load and greatest at heavy loads, the whole being preferably so arranged that the time that switch 46 remains shut is generally proportional to the magnitude of the transmitted load prior to the fault.

In another form of the invention, instead of applying braking load to that segment of the system which had been supplying load prior to the fault, the mechanical driving power supplied to at least some of the generators within that segment is momentarily decreased for a preselected period of time when the segment is isolated so as to result in an effect similar to that obtained by the application of a braking load.

In the case of steam turbines, for example, this can be accomplished by providing for rapid momentary closure or partial closure of the turbine steam inlet control valves in response to an electrical signal. In the case of gas turbines and diesel engines, a liquid fuel valve may be controlled.

FIG. 11 shows one means of accomplishment. Thus, in FIG. 11 turbine 46A drives generator 1 by means of steam admitted through valve 47 which is operated in response to motion of piston 48 of oil cylinder 49.

Displacement of piston 48 is controlled by servo valve 50 which is supplied with oil by pump 51 and is actuated in response to the position of fly balls 52 and valve 47, through levers 53 and 54.

One end of lever 54 is normally held against stop 55 by spring 56. However, when contacts 12 close, solenoid 58 is energized through normally closed time delay opening relay 57 and acts to depress lever 54, thereby simulating an increase in speed and acting to close valve 47 independently of the fly balls 52.

Relay 57 opens after a controlled dwell period and thereby opens the circuit to solenoid 58 which allows lever 54 to move back against stop 55 with the result that valve 47 returns to its position prior to the fault, subject to any minor influence of the fly balls resulting from speed change occurring during the period of relay operation. The time delay introduced by time delay relay 57 can also be made to depend upon the power transmitted before the fault by substituting for relay 57, relay 44 of FIG. 10, plus the associated equipment of FIG. 10.

FIG. 12 discloses an alternative embodiment of the form of my invention disclosed in FIG. 5, like reference numerals being used for similar parts. The contact making wattmeter 60 has its contacts 61 connected on one side to the lower of the two contacts 12 and on the other side to one side of contacts 62 of normally closed momentary time delay opening relay 63 and through 62 to the coil of normally open relay 64. One side of normally open contacts 65 and 66 of relay 64 is connected to the lower of the two contacts 12. The other side of contact 65 is connected to the coil 13b while the other side of contact 66 is connected to the coil of relay 64. The relay 63 has its coil connected to be energized when contacts 12 close whereupon contacts 62 open after a momentary time delay.

In the event that a fault occurs on line 4 at a line load condition at which the wattmeter contacts 61 are closed, current flows from battery B through contacts 12, which were closed in response to the fault, and through contacts 61 and contacts 62, to energize relay 64 thereby closing contacts 65 for energization of the coil 13b which closes the switch 16. Also when relay 64 closes its coil is energized through contacts 66 to remain closed. Switch 6 is already closed. Therefore the resistors 7 and 17 are now both connected to the bus 15c.

In the event that the power transmitted over the line just prior to the fault is less than the preset value of load at which the wattmeter contacts close, the contacts 61 are open when the fault occurs and the resistor 17 is not connected to the bus 15c. Moreover, if the contacts 61 should close in response to the fault, after an inherent time delay characteristics of the device, the contacts 62 will then have opened, since the coil of relay 63 was energized to open 62 by the battery when contacts 12 closed. While the wattmeter moving element is fast enough to follow power changes prior to a fault, the relay 63 is chosen fast enough to open before any significant movement of the wattmeter moving system can occur, whereby energization of the coil 64 is prevented.

FIG. 13 discloses an alternative embodiment of the form of my invention disclosed in FIG. 10, like reference numerals being used for similar parts some of which are used in FIG. 12. The relay 44 is a normally closed, manually adjustable time delay opening relay having a control knob 45 for manually setting its time delay, and controlling contacts 46, while relay 67 has two pairs of contacts the lower pair 68 being normally closed and the upper pair 69 being normally open.

In the event of a fault occurring at a time when the line load is sufficient to maintain the contacts 61 closed, the contacts 12 close whereupon current flows from the battery B through contacts 61 and contacts 62 to energize the coil of relay 67 and thereby open the contacts 68. Simultaneously current flows from the battery through contacts 46 and coil 13 to close switch 6 and connect resistor 7 to the bus 15c. Also the contacts 69 close to maintain energy in the coil of relay 67 when contacts 62 open after a time delay. Since contacts 68 were opened, the continued energization of the coil of relay 44 is prevented, hence contacts 46 are not opened and switch 6 remains closed until contacts 12 open.

In the event that the fault occurs at a line load at which the contacts 61 are open, contacts 68 remain closed and contacts 46 open after the preset time delay of the relay 44 which causes switch 6 to open in a corresponding preselected time, thus removing resistor 7 from bus 15c at a preselected time and by appropriate time setting as controlled by position of knob 45, prior to the opening of contacts 12. Moreover, if the contacts 61 should close in response to the fault, after an inherent time delay characteristic of the device, the contacts 62 will then have opened since the coil of relay 63 was energized to open contacts 62 by the battery when contacts 12 closed, whereby energization of the coil of relay 67 is prevented.

The circuit of FIG. 13 can also be used in place of FIG. 10 as a means of causing the time delay introduced by the time delay relay of FIG. 11 to depend upon the power transmitted before the fault.

The schematically illustrated transmission line relaying and switching means may take one of many complex forms, in practical application, such as disclosed in AIEE Transactions, vol. 71, Part III, p. 661 et seq., "Power Line Carrier for Relaying and Joint Usage," and in AIEE Transactions, vol. 73, Part III-B, p. 842 et seq., "An Advance in Pneumatic Mechanism for High Voltage Power Circuit Breakers."

Such line circuit breaker and relaying forms may be represented adequately by the circuit of FIG. 14 wherein 103 represents the complete breaker and associated control system, 109 represents a quick opening and closing relay controlling contacts 112 in response to current in coil 110, and 111 represents the balance of the relaying system.

Such elements which normally incorporate the provision that breaker 103 will lock out after indication of a refault on reclosing, can be substituted for corresponding elements in earlier FIGS. 2, 5, 9, 11 and 12, provided that in FIGS. 2, 5, 9 and 12 resistor breakers 6 and 16 are replaced by a breaker and control system which will cause the substitute breaker or breakers to close rapidly in response to the only momentary closure of contacts 112, and thereafter open rapidly after a preset time delay which is capable of being adjusted so that the substitute breaker or breakers will open and lock in that position at about the time when the contacts of breaker 103 reclose, while also the same breaker and delay systems can be substituted for corresponding elements of FIG. 10 and FIG. 13 if provision is made so as to maintain energization of relay 44 for a preset period longer than the timing period of this relay, after only momentary energization by relay 109, and to lock the substitute breaker in the open position after it opens.

Provision of controls as above can be readily carried out by persons skilled in the art of relaying, by mere rearrangement of the type of equipment used in connection with provision for automatic line breaker reclosing, while also provision of breakers for load application capable of rapid closing followed by rapid reopening can be had by designing so that both of these actions take place under the effect of precompressed springs, in accordance with principles already described in AIEE Transactions, vol. 63, p. 784 et seq., "Tests of 230-Kv. High-Speed Reclosing Oil Circuit Breaker."

For example, the resistor load circuit breaker may be generally of the type illustrated in FIG. 15 wherein the position of rod 72 carrying bridging contact 71 controls the electrical bridging of contact studs 70 while tension springs 76 and 77 acting on lever 73 through rod 74 and floating lever 75 tend to raise and lower contact 71, respectively, while, in the position shown, motion of lever 75 and hence of rod 72 is restrained by toggles 78 and 79.

Admission of air to pneumatic cylinders 80 and 81 through valves 82 and 83 cocks the mechanism and serves to set the toggles in the position shown, while actuation of trip coils 84 and 85 respectively effect mechanical tripping of the toggles whereby to release lever 75 to the action of springs 76 and 77 respectively. Immediately after the breaker is cocked valves 82 and 83 are opened and accordingly thereafter energization of coil 84 will cause the breaker to close while subsequent energization of coil 85 will cause it to open.

Trip coils 85, which operates to open the breaker, is connected in series with auxiliary switch 86, so that it is inoperative except when the breaker is closed.

After the closing and opening cycle has been completed, the breaker is locked open until by the sequential admission of air, first to cylinder 80 and second to cylinder 81 the mechanism is recocked.

As shown control coils 84 and 85 are selectively subject to the action of double pole double throw relay 87 which is energized by relay 88 when condenser 89 is charged through resistor 90 after auxiliary relay 91 closes momentarily on momentary bridging of terminals 92 and, in turn, energizes coil 84 to close the breaker while the setting of shaft 145 of variable time delay opening relay 144 controls the time that will elapse before relay 87 is deenergized, by the opening of contacts 146, and the breaker opened in response to energization of trip coil 85, the size of condenser 89 being made such as to hold relay 88 closed for a period somewhat longer than any desirable time setting of relay 144.

In FIG. 15 item 93 represents a pair of terminals which are energized when relay 88 is energized.

FIG. 16, wherein the complete breaker and control system of FIG. 15 is represented by item 106 and another duplicate system by 116, illustrates how the breaker and control system of FIG. 15 together with items 103 and 109 and 111 of FIG. 14 may be substituted in FIG. 5, and it will be evident that the same type of substitution may be made in FIG. 9 without altering these circuits functionally.

Similarly FIG. 17 illustrates a revised form of FIG. 10 and FIG. 18 a revised form of FIG. 11, while it will be evident that FIGS. 12 and 13 can be similarly revised.

Besides incorporating elements 103, 109 and 111 in place of 3, 9 and 11, FIG. 18 shows further changes, some of which add to the scope of the present invention. Thus in FIG. 18 closure of quick opening and closing contacts 112 acts through relay 91 and resistor 90 to charge condenser 89, close relay 88 for a delay period longer than any desirable delay setting of relay 44, and actuate spring loaded normally closed 3-way hydraulic spool valve 159 to admit oil to cylinder 158, which results in depression of lever 154 and, via action of auxiliary servo system 162, causes motion of the stem of valve 47 in a valve closing direction. Also, at the same time valve 160, which is not spring loaded, opens to admit oil to adjustable stroke cylinder 161 which is arranged to move stop 55 downward a controlled amount.

After relay 44 times out spring loaded valve 159 returns to its initial position, thereby allowing discharge of oil from cylinder 158 to the oil tank under the influence of spring 56, and upward movement of lever 54 at a rate controlled by flow control valve 162a. At the same time since valve 160 is not spring loaded it will maintain oil pressure in cylinder 161 and thereby cause the upward motion of lever 54 to terminate at a lower point than prior to the fault.

Advantage of these arrangements is that by control of the setting of valve 162a it is possible to control the rate at which steam valve 47 tends to open when the line fault is cleared, while adjustment of the stroke of variable stroke cylinder 161 makes it possible to preestablish a revised turbine speed load characteristic which will obtain subsequent to the fault, subject to repositioning of valve 160 by manual or manually controlled means. The effect of these controls is thus to provide a means of regulating rate and extent of regeneration of prime mover motive force, subsequent to reclosing of the line breaker.

Timing of 44 is controlled via rotation of shaft 45 which is driven by disc 18, which in turn is driven by shaft 21 over spring 22, and locked momentarily by brake 25 at the angle obtaining just before the fault. Dotted lines from both the wattmeter to shaft 21 and from gear 163 which is driven by rack 164 are intended to indicate that an election can be made to move shaft 21 either in response to transmitted power or to turbine valve gear motion.

As to such election, whereas, in the general case, applying to any sort of generating segment of a power system, it is requisite that control either of braking load or of degree of rapid prime mover valve action be made responsive to power transmitted away from the segment, in the case of isolated or substantially isolated power plants, and when, if braking resistors are used, each generator is equipped with its own control of degree of braking and/or prime mover valve gear motion, these controls can without disadvantage be made responsive to either individual generator output, or alternately to prime mover valve gear motion since if there is no or little local load the total transmitted power just before the fault will be substantially equal to the sum of the power outputs and inputs of each unit.

Whereas FIG. 18 shows by way of illustration a multistage servo system wherein the motion of lever 54 is transmitted to valve 50 via an intermediate servo system, it is to be understood that operation would be equally possible in which 162 is replaced by a direct mechanical connection as in FIG. 11.

Whereas in the foregoing, for simplicity, the circuits shown did not include transformers, for stepping up generator voltage to a higher line voltage, it is to be understood that in practice line voltages will normally differ from generator voltages. Also in such case the normally open circuit breakers used for load application are preferably connected to the generator bus with a view to simplifying resistor design.

Whereas in connection with electrically paralled circuit transmission arrangements of FIGS. 7 and 8 hereinbefore provision has been made for decoupling the generating segment prior to applying means of decelerating the generator segment, whether by use of a braking load or through rapid governor action, it will be apparent that the regulating devices that have been described may also be utilized so as to improve stability when the feature of decoupling is not used.

Thus with lines operating electrically in parallel the feature of decoupling will generally only be of advantage when use of braking resistors provides the only available means of decelerating the generating segment, whereas when rapid governor action can be used in place of a braking load it will normally be advantageous to omit the feature of decoupling by opening both sets of line breakers, and instead open only the breakers at both ends of the faulted line thereby to isolate the fault. In such case, moreover, use of provision to reclose automatically can be optional rather than requisite.

Whereas it has been recognized in the literature that in the case of such switching out of one of two parallel lines certain advantages could accrue in respect to improvement in power transmission system stability were means available whereby generator prime mover driving power could be rapidly and suitably controlled in the event of faults, heretofore automatic means of effecting suitable control have not been proposed.

The arrangement of FIG. 19 of the present invention illustrates one such means, specifically means whereby motive power input to the prime movers in a generating segment of a power system may be varied momentarily, and in a suitable manner, subsequent to the occurrence of a fault on one of two or more electrically parallel lines, in dependence on power flow conditions obtaining just prior to the fault.

To accomplish this result one or more of the generators of FIG. 7 or 8 is equipped so that in the event of a fault on one line only the breakers at either end of the faulty line clear and the turbine steam valve or valves are subject to a closing cycle the duration of which is made to depend on the total transmitted power just prior to the fault. Specifically FIG. 19 shows a circuit adapted to accomplishing this result in application to segment 1 of FIG. 8.

In FIG. 19 relay systems 111a and 109a control breaker 103a, and 111b and 109b breaker 103b, so that a fault on a line opens only the breaker on that line with the further provision that breaker systems 103a and 103b may be either of the reclosing or non-reclosing type. At the same time auxiliary contacts 165 in relay systems 109a and 109b are externally paralleled to control the relays and hydraulic controls shown in FIG. 18, in place of control by contacts 112 of relay 109, the circuits and connections being the same throughout. In addition auxiliary tap changing current transformers 166a and 166b provide a means whereby the wattmeter may be made to measure the weighted sum of the powers supplied over each line, and thereby the extent of turbine valve action resulting in the event of a fault may be controlled in dependence on the value of such a weighted sum just prior to the fault.

This feature of providing control in response to a weighted sum of transmitted powers is introduced due to the fact that, in general, for an optimum result, the degree of control desirable will depend on system conditions including, in particular, system connected generating capacity, and in the case of systems such as in FIG. 8, where lines are not connected to a common but at the receiving end, on the distribution of load over each of the electrically parallel lines. Thus, the desirable control of the power input to a prime mover of a generator such as generator 1 in FIG. 8 will depend not only on the total load being supplied over lines 38 and 39, but also on the distribution of load on these lines, as well as on the connected generating capacity in the other two systems.

On the other hand, in the case of parallel lines which terminate in a common bus at either end, the total or net power transmitted over both lines will provide the proper index of prime mover control in the event of a fault on either line, which implies that in this case the auxiliary transformer taps should be given equal settings.

In general, with use of the arrangement of FIG. 19 the degree of power input control effected should be substantially less than when complete generating segment decoupling is employed, in line with the necessarily lesser value of change in generating segment driving power which develops when only one of two electrically parallel lines is decoupled. In practice the desirable degree of control can, however, be calculated in advance by established procedures, from a knowledge of pertinent system conditions.

After such calculation the taps on the auxiliary transformers may be set appropriately to afford a favorable degree of control.

Another further approach to the problem of maintaining stability in systems wherein a plurality of lines connect the generating segment to the balance of the system, which is adapted for use when the generating segment includes more than one connected generator, comprises, in the event of a fault on a single line, isolating only the affected line, and simultaneously reducing the generating segment accelerating power by decoupling one or more of the generating segment generators during the period that the faulted line is open, applying a braking load and/or a reduction of driving power to the decoupled generator or generators during the said period, and removing the braking load and reconnecting the said decoupled generator or generators to the generating segment at about the time that the line circuit breakers reclose.

This approach, which, it may be noted, is particularly useful in the case of water turbine type prime movers due to the need in such case of closing turbine inlet valves only slowly, is illustrated in FIG. 20 for the case of three generators connected by transformers to a common high voltage bus through high voltage breakers, one of which, 103c, is of the automatically reclosing type.

Thus referring to FIG. 20 it will be seen that a fault on either line besides opening the line breaker on the faulted line will close one set of contacts 165 and thereby act not only to momentarily open the breaker in the affected line, but also to momentarily open breaker 103c and momentarily close breaker 106, the period of closure of breaker 106 being governed by the position of disc 18 as determined by the weighted sum of the powers transmitted from the generating segment over lines 38 and 39 just prior to the fault.

It may be desirable to decouple and apply a controlled braking load to more than one of a plurality of generators, or to apply a combination of braking load and prime mover valve control, or to use a commutator actuated in response to the sum or weighted sum of the powers transmitted from the generating segment over each parallel line just prior to the fault to select one or more of a group of generators for decoupling, or to selectively apply one or more resistive loads in response to the sum or weighted sum of the powers transmitted from the generating segment over each parallel line just prior to the fault, thereby to variably control the degree of braking effect during the period of decoupling in response to the said sum or weighted sum of powers.

As another variant applying to a two line transmission system, two groups of generators can be decoupled and subject to braking load, one group in response to faults on one line, and one in response to faults on the other, and both for faults on both lines.

Thus FIG. 21 illustrates how this can be done for the specific case of a two line system transmitting power from a two generator generating segment.

As a practically desirable feature making possible the use of load application breakers of only moderate interrupting capacity, it may be desirable to introduce a reactor between the generator bus and the associated load applying breaker, as illustrated in FIG. 22 wherein braking resistor 7 is shown arranged so that it may be connected to generator 1 through reactor 170 and load applying breakers 6 and 6a.

Whereas what we have so far considered takes account of the normal case of a fault on a line, which clears when the line breakers open, and which does not reestablish when the linke breakers reclose, in practice it is desirable to provide a means of dealing with the less usual but important case in which the line fault reestablishes when the line breakers reclose, after which, in accordance with established power system operating practice, automatic means act to reopen the line breakers and lock them out until they are reclosed manually.

When such a refault occurs, the remedies of reapplication of braking load and/or effecting both a momentary and a sustained reduction of generating segment prime mover motive force, continue to be useful.

However, due to the compound effect of the shock to the system of two faults in rapid succession, plus the fact that after the refault is cleared the synchronizing power of the transmission system is reduced by virtue of loss of the faulted line, it may be desirable to provide a means of increasing both the degree of momentary braking load effect and/or prime mover motive power change, as well as the extent of the sustained change accomplished by biasing prime mover control systems relative to the changes which are first employed subsequent to an initial fault.

Related to the foregoing is an aspect of my invention which relates to provision for preventing excessive deceleration of a complete system comprising a generating and receiving segment taken together which can develop as a result of application of the means of braking load or prime mover motive power reduction which have been described, and which have as object preventing loss of synchronism of the segments.

This can be important in cases when either the generating or receiving segment incorporates what may be described as loosely connected elements.

For example, as shown in FIG. 22, we may have the case where a pair of generators 1a in a generating station comprising the generating segment of a first power system, system 1, furnish power through transformers 171 and circuit breakers 172 to bus 173a from which it is transmitted via circuit breakers 174 and lines 175a and 175b of a transmission system, which we will designate as a primary transmission system, to a portion of the first system comprising the receiving segment of said first system, which receiving segment incorporates generating capacity in one or more power stations, as generators 1b and 1c of FIG. 22, which power stations have, generally speaking, electrically rigid ties one to another, whereby the generators of each station in the receiving segment tend to decelerate and accelerate together in the event of variations in primary transmission line transmitted power, while also the receiving segment of the first system may have one or more electrically weak ties to other power systems, thus as shown in FIG. 22, line 176 which connects systems 1 to system 2 through transformer 177.

By the words weak tie is meant, in the context above, a tie the synchronizing capacity of which is low in relation to the inertia of the generating capacity of the elements that are connected by the tie.

In the case of such a weak tie from a first such system to a second system, the effect on the first system of a sudden reduction in power transmitted over the primary transmission line will be to decelerate primarily only the machines of the receiving segment of the first system, since machines in the second system tend to decelerate only by virtue of the change which takes place in the power transmitted by the tie line between the first and second systems, and this will be small relative to the inertia of the second system.

Under the circumstances it will be understood that it will result that in the event of a fault followed by application of braking load and/or reduction of prime mover motive force, in the generating segment of the first system, this segment, and eventually the first system as a whole, will decelerate more rapidly than the second system, and the result could be that the first system, as system 1 of FIG. 22, would lose synchronism with the second, as system 2 of FIG. 22, even though the two segments of the first system remain in synchronism.

This loss of synchronism of systems, in turn, will result in relay action which will normally open the breakers at one or both ends of the intersystem tie line 176 with generally speaking adverse effect on both systems.

A feature of the present invention which offers a means of overcoming the effects just described, is an arrangement adapted to rapidly effect a momentary increase in the motive force applied to the moving elements of one or more of the generator prime movers of the receiving segment of the first system in response to indication of a fault on the primary transmission system.

Another method is to provide so as to momentarily drop a preselected portion of the first system receiving segment load in response to such a fault indication, as by opening any of breakers 178a to 178h inclusive of FIG. 22.

In either case it will be advantageous for the amount of prime mover motive force increase, or load dropped, to be made variable dependent on the load being transmitted over the primary transmission line just before the fault, so as to avoid unnecessary dropping of load and/or unduly accelerating the first system and thereby creating a sufficient cause for development of loss of synchronism with the second system, in the event that a fault occurs on the primary transmission system at only a low value of transmitted load.

At the same time with a view to preventing development of unstable transmission of power over the primary transmission system it can be advantageous to provide so that the control system of one or more prime movers driving the first system receiving segment generators, as generator 1b of FIG. 22, be automatically given a bias, when a line fault occurs, such that after the fault has cleared the generators in question will tend to take up more steady load than they would in the absence of such bias.

Further, it will be desirable to provide so that in the event of a refault, further momentary increase in first system receiving segment prime mover motive force and/or further dropping of load occurs, and also that a different, and in general greater prime mover control system bias is introduced.

Before proceeding to described means of accomplishment of the foregoing aspect of the present invention, it is desirable to note that whereas in earlier figures steam turbine driven prime movers have been shown as equipped with a single governor system, in actual practice most power systems utilize compound steam turbines with means of reheating the exhaust from the high pressure turbine before the reheated steam is admitted to the low pressure or intermediate and low pressure turbines. With such compound turbines it is customary to provide a separate preemergency governor which can quickly come into play to close the intercepting valve in the event of sudden loss of turbine load, in order to prevent the steam in the reheat boiler from acting to speed up the turbine.

By virtue of the same considerations, it will in general be desirable, in applying those phases of the present invention having to do with prime mover motive force reduction to compound turbines equipped with the intercepting valves, to provide for rapid closing of the intercepting valve as well as the main steam inlet control valve in response to indications of a line fault.

FIGS. 23 and 24 illustrate methods of accomplishment of the objectives outlined above.

FIG. 23 shows a power plant which incorporates two steam driven turbine generators feeding a high voltage bus through transformers and circuit breakers, and with transmission lines connected to the bus through circuit breakers, and also load busses attached to the bus through circuit breakers and transformers.

In addition, in conjunction with each generator there are shown two load application circuit breakers 6 and 6a, connected in parallel and arranged to provide a means of connecting a braking resistor 7 to the generator terminals via a reactor 170.

FIG. 23 also shows in simplified form elements of the transmission line relaying system comprising respectively current transformers 111, line parallel resonant chokes 192, coupling capacitors 194 and carrier current fault relaying systems 196a and 196b. Thermal converters 198a and 198b are also shown. These converters are to be understood to be connected into the relaying system in such a way as to provide an output voltage which is a measure of the power being transmitted over lines 175a and 175b respectively. Amplifiers 200a and 200b are shown connected so as to amplify the sum of the converter voltages and to feed their outputs to timing systems 202a and 202b which in turn have connection to the turbine generators and their hydraulic controls.

FIG. 23 thus shows a power station which represents a composite of the generating system power station of FIG. 22 which incorporates bus 173a, and the receiving system power station of FIG. 22 which incorporates bus 173b. FIG. 23 therefore represents a power station incorporating the present invention in a form adapted to the general case of a station which might at times be called on to transmit power over lines 175a and 175b, or at other times might be called on to receive power over these lines.

FIG. 24 provides more details of the turbine generators and their hydraulic controls and in this connection shows by way of illustration a compound turbine comprising a high pressure turbine, followed by reheat boiler and intermediate and low pressure turbines.

As shown in FIG. 24, high pressure turbine 182 is provided with a steam inlet valve 183 controlled by a governing mechanism 184, which, by way of illustration, is shown to incorporate a fly ball type speed sensing mechanism, but which as is well known in the art, could incorporate other generally acceptable sensing mechanisms, as for instance mechanisms responsive to oil pressure developed by a moving impellor, or mechanisms responsive to the output of a permanent magnet generator driven at a speed proportional to the turbine speed.

As shown in FIG. 24, steam leaving the high pressure turbine passes through a reheat boiler and thence to inlet valve 187 of intermediate pressure turbine 188, and thence directly to low pressure turbine 189.

Intermediate pressure inlet valve 187 is shown controlled by a preemergency type governing mechanism 190 which, also, merely by way of illustration, is shown controlled by fly ball type speed sensing device.

Motor driven synchronizing springs 192 and 193 are shown as components of the above governor mechanisms and it will be readily understood by those skilled in the art that the speed control effects of the governors can be influenced by a suitable actuation of the synchronizing spring motors, whereby to increase or decrease the force exerted by the springs.

It will be further understood that since the intermediate pressure turbine governing system 190 is to be normally utilized as a preemergency governor, the compression of synchronizing spring 193 would normally be made such that governing mechanism 190 will not act to close valve 187 until the speed of the generator has increased a preset amount above normal operating speed, whereas on the other hand the compression of spring 192 together with the action of the fly balls 168 will act to continuously control the relation of the turbine load to turbine speed.

Referring to FIG. 24, in normal operation all valves, cylinders and circuit closers will be in the positions shown, and speed control will obtain through the function of governor mechanism 184 transmitting its control motion through links and lever 185 to levers 186 and 194, which latter lever is normally held stationary. The governor motion is transmitted through linkage 188 to reposition the hydraulic pilot 189 of servo valve 219 causing an unbalance in the hydraulic output pressures to cylinder 196 which results in motion of rod 191 in a direction to reposition the moving element of prime mover valve 183 while also a feed back motion is transmitted through the left hand linkage of lever 185 to return the system and pilot to a null balance condition as equilibrium is reestablished. Intermediate pressure turbine valve 187 is shown controlled in a similar manner with feedback from the lever arrangement attached to preemergency governor mechanism 190 which however is normally adjusted to keep valve 187 wide open until a preset speed increase has occurred.

Referring to FIG. 23, auxiliary contacts 165 in fault relaying system 196 control energization of timing systems 202a and 202b through the action of short circuiting terminals 92.

Referring now to FIG. 24, normally closed contacts on contactors 195a and 195b in the timing systems 202a and 202b hold pilot valves 199 and 201 in position for normal operation and thereby the direction of oil pressure in cylinders 203 and 205 such that their piston rods are fully extended, while the smaller pistons of stop cylinders 207 and 209 are prevented from stroking notwithstanding the oil pressure behind the pistons in view of supply of oil through pilot valves 211 and 213 and pressure compensated flow control valves 215 and 217. Thus both ends of lever arm 194 are held in a stationary position during normal operation.

Referring to FIG. 23, occurrence of a fault on the transmission system causes auxiliary contacts 165 of either fault relaying system 196a or 196b to close, and at the same time closes the trip circuit of the appropriate circuit breaker 174. During the period of normal transmission prior to the fault, line power has been measured as sensed by thermal converters 198a and 198b whose D.C. output voltage is amplified through amplifiers 200a and 200b, and fed into timing systems 202a and 202b. Amplifiers 200a and 200b discriminate as between polarities of converter output such that amplifier 200b amplifies only outgoing power indications while amplifier 200a amplifies incoming power indications.

Operation of contacts 165 of the fault relaying system also energizes relays in the timing systems 202a and 202b and contactor 195b (see FIG. 24) in timing system 202b which will close upwardly in response to this relay operation if the power is outgoing and exceeds a predetermined control setting in timing system 202b. The internal circuits of the timing systems are such that contactor 195a (see FIG. 24) in timing system 202a will close upwardly if the power is incoming and exceeds a predetermined control setting in timing system 202a. Should the measured power be outgoing and exceed the control setting in timing system 202b, contactor 195b (see FIG. 24) will close upwardly for a time interval which will be dependent on the measured power in a way determined by an adjustable setting in system 202b.

The closing upwardly of contactor 195b (see FIG. 24) energizes pilot valve 199 reversing oil pressure to cylinder 205 and stroking it in a downward direction. This motion is transmitted through linkages 194, 186 and 188 to reposition the hydraulic pilot 189 causing cylinder 196 to stroke downward thereby tending to close prime mover valve 183. When cylinder 205 is stroked downward, it allows oil to flow into stop cylinder 207 at a rate controlled by the setting of pressure compensated flow control valve 215. When contactor 195b (see FIG. 24) closes downwardly under control of timing system 202b, solenoid valve 199 is energized in a direction to reverse oil flow to cylinder 205, causing it to stroke upward to a position established by the depressed position of the piston rod of stop cylinder 207. This restricts the opening of prime mover valve 183 to a smaller value than its original setting.

If the reclosure is successful, the prime mover remains on this reduced valve opening until such time as manually reset by the opening of valve 221 whereby to drain oil from stop cylinder 207. In the event reclosure was not successful, contacts 165 of relay fault systems 196a or 196b again operate, shorting terminals 92 and energizing relays in timing system 202b, thereby causing contactor 195b (see FIG. 24) to close upwardly for a new preset time related to the transmitted power prior to the first fault. This contactor only closes upwardly if the transmitted power exceeds a control setting in timing system 202b.

Closing contactor 195b (see FIG 24) repeats the operation of stroking cylinder 205 downward as in the previous fault, but with a new time interval control. The timing system 202b also closes contactor 225b at this time, energizes solenoid valve 211 and allows oil under flow control by valve 227 to enter stop cylinder 207 until contactor 195b closes downwardly, after a time interval, under control of timing system 202b, when the oil supply is reversed into cylinder 205 stroking it upward against a new position of the rod of stop cylinder 207. This new position causes a further reduction in the opening of prime mover valve 183 from its opening position prior to the refault. Further flow of oil into stop cylinder 207 is overcome by the pressure against its rod from cylinder 205.

Should the station be receiving power, acceleration of the prime mover is required for stability during faults. In this case the protective controls respond to the fault in a generally similar manner to the case of power transmission. Referring to FIG. 24, timing system 202a responds to its relay operation by closing upwardly contactor 195a if the measured received power is above the control setting in timing system 202a. In this event contactor 195a energizes pilot valve 201, reversing oil pressure to cylinder 203, stroking it upward. This motion is transmitted through linkage 194, 186 and 188 to reposition the hydraulic pilot 189 causing cylinder 196 to stroke upward, thereby tending to open prime mover valve 183. When cylinder 203 strokes upward, it allows oil to flow into stop cylinder 209 at a rate controlled by the setting of flow control valve 217. When contactor 195a closes downwardly under control of timing system 202a, solenoid valve 201 is energized in a direction to reverse oil flow to cylinder 203 causing it to stroke downward, but to a position established by the elevated position of the rod of stop cylinder 209. This holds open prime mover valve 183 at a larger value than its normal setting.

If the reclosure is successful, the prime mover valve retains this position until manually reset by control through valve 218, thereby to drain oil from stop cylinder 209. In the event reclosure was not successful, contacts 165 (see FIG. 23) again operate, shorting terminals 92 and energizing relays in timing systems 202a and 202b, thereby causing contactor 195a to close upwardly for a new preset time related to the value of power received over the transmission lines prior to the first fault. Contactor 195a only closes upwardly if the received power exceeds a preset control setting in timing system 202a. Closing upwardly contactor 195a repeats the operation of stroking the piston of cylinder 203 upward as in the previous fault, but with a new time interval under control of timing system 202a. The timing system 202a also closes contactor 225a at this time, energizing solenoid valve 213, and allows oil under flow control by valve 216 to enter stop cylinder 209 until contactor 195a closes downwardly, after a time interval, under control of timing system 202a, when the oil supply is reversed into cylinder 203, stroking it downward against a new position of the rod of stop cylinder 209. This new position causes a further reduction in the closing of prime mover valve 183 from its closing position prior to the refault. Further flow of oil into stop cylinder 209 is overcome by the pressure against its rod from cylinder 203.

Referring to FIG. 24, it will be apparent that cylinder 229 connected to the intermediate pressure turbine governor operates simultaneously with cylinder 205 for deceleration control by means of turbine valve 187.

FIG. 25 shows one practical form of timing system for performing control and timing features. In this system the output of either of the thermal converter amplifiers shown in FIG. 23 is received at terminals 246 and energizes two D.C. voltage responsive null type motor driven self balancing recorders 240a and 240b, such as are available commercially, but modified by provision of an extra pen carriage drive motor, and with provision so that the motor used can be optionally selected to be either the usual conventional balancing type or, alternately, a variable speed motor, of any suitable commercially available type, the speed of which can be preset by potentiometer control, and which is operative when energized to drive the pen carriage back toward zero position.

Referring to FIG. 25 conventional balancing pen drive motors 242a and 242b are normally operative through the upper contacts of relays 250a and 250b and cause recorder 240a and 240b to indicate the magnitude of power which conforms to the thermal converter amplifier output.

When a fault occurs, fault relaying system auxiliary 165 contacts of FIG. 23 close, completing the circuit through terminals 92, which energizes relay $RY_1$ and $RY_2$. Relay $RY_1$ is held closed, by means of the charge of capacitor 247 which is connected across its coil, for a time interval exceeding that of a fault and refault. With relay $RY_1$ energized, its contacts 252a open the circuit to terminals 248a and 248b, thereby deenergizing relay 250a and 250b which in turn results in deenergization of balancing motors 242a and 242b, thereby halting motion of both recorder pen carriages. Relay $RY_1$ also closes its normally open contacts 253a, applying potential to contacts 254a which are closed if the transmitted load is above the setting of cams 256a, and in this case energizes the coil of contactor 195 and opens its normally closed contacts 258a and deenergizes relay 260a, thereby energizing variable speed motor 262a, which in turn causes the pen carriage to move toward the zero power position at a rate controlled by presetting of potentiometer 264a.

This down scale motion of the recorder movement continues until cam 256a opens contacts 254a releasing contactor 195, whereby contacts 258a again close and terminate the movement of motor 262a. The timed closing is available to control solenoid valves, circuit breakers or other apparatus through contactor 195.

If automatic line circuit breaker reclosure does not result in a refault, the circuit to terminals 92 will be opened releasing relay $RY_2$ immediately. Also eventually relay $RY_1$ will release when the charged capacitor across its coil reaches the drop out potential of the relay, and when relay $RY_2$ drops out, capacitor 265 is charged through the circuit of relay $RY_1$ contacts 266a and relay $RY_2$ contacts 266b.

In the event that a refault occurs when the line circuit breakers reclose, the circuit to terminals 92 is reclosed, reenergizing relay $RY_2$. The charged capacitor 265 is applied to the coil of contactor 225 through relay $RY_2$ contacts 266a, relay $RY_2$ contacts 266b and recorder cam contacts 254b. If the transmitted load, prior to the first fault, is above the setting of cam switch contacts 256b, contactor 225 closes and is held closed by its normally open contacts 268, contacts 258b by opening act to deenergize relay 260b and thereby initiate down scale motion of the recorder pen carriage until cam 256b opens contacts 254b, which results in turn in release of contactor 225 and reenergization of relay 260b which stops the pen carriage.

This timed closing and opening of contactor 225 is adapted for use to control solenoid valves, circuit breakers or other apparatus. Also with switch 270 closed, contactor 195 will close and open simultaneously with contactor 225 repeating its previous functions for a time interval controlled by potentiometer 264b. However, cam operated contacts 254a do not control contactor 225 in view of diode 272.

If the refault does not reoccur, the circuit to control terminals 92 remains open, releasing relay $RY_2$. Relay $RY_1$ opens when the capacitor 247 connected to its coil discharges to the drop out potential of the relay. This discharge current is confined to the coil of relay 247 by virtue of diode 274.

FIG. 26 illustrates an alternate timing system which employs solid state circuitry.

Referring to FIG. 26, input voltage supplied from thermal converter output amplifiers shown as 200a and 200b in FIG. 23, is applied to terminals having transistor $T_1$ connected thereto in the normal emitter follower configuration. Output voltage of this transistor with respect to ground is substantially the same as input voltage. Four diodes 305 provide stabilized potentials for the timing system.

Two capacitors $C_1$ and $C_2$ are normally connected to transistor $T_1$ through contacts on relay $RY_1$. The charge on these capacitors follows the output voltage of transistor $T_1$.

When a transmission line fault occurs, the auxiliary control contacts 165 of FIG. 23 close and complete a circuit through terminals 92, which energizes relay $RY_1$ and $RY_2$. Relay $RY_1$ is held closed by means of capacitor 280 across its coil, for a time interval exceeding a period of a fault and refault.

With relay $RY_1$ energized, the voltage of capacitor $C_1$ is applied to diode 290, reverse biasing this diode, which allows electronic switch #1 consisting of a Schmitt trigger circuit to switch on power amplifier #1 and energize contactor 195. Electronic switch #1, however, will not operate unless gating diode 286 is reverse biased. This diode is reverse biased only when amplified thermal converter output voltage received at terminal 282, and applied to $C_1$ by the closing of contacts of $RY_1$, exceeds the reference voltage obtained from diode 285 and applied to transistor 284, making this transistor conduct and reverse biasing diode 286. This gating circuit prevents operation below preset load conditions. When electronic switch #1 has triggered, transistor 287 becomes nonconducting and maintains reverse bias on diode 288, disabling the diode 286 circuit from transistor 284.

The capacitor $C_1$ is also caused to discharge through an adjustable resistor $R_1$. When capacitor $C_1$ reaches a potential negative with respect to ground, diode 290 becomes forward biased, restoring electronic switch #1 to normal, this opens the power amplifier #1 circuit and contactor 195.

Referring to FIG. 24, the contactors 195a and 195b therein shown correspond to contactor 195 of FIG. 26, and operate to control either valves 199 or 201, in dependence on whether the bus is receiving power from or feeding power to the transmission line.

When refault does not occur when the line breaker recloses, the control contacts connected to terminals 92 remain open and relay $RY_1$ opens when the capacitor across its coil discharges to the drop out voltage of this relay, and capacitors $C_1$ and $C_2$ are then reconnected to the input circuit through $T_1$.

Should a refault occur when the line breaker recloses, relay $RY_1$ is still closed, and relay $RY_2$ will be energized again by the closing of control contacts across terminals 92. The closing of relay $RY_2$ could cause the application of the charge on capacitor $C_3$ to a monostable switch consisting of a monostable multivibrator circuit such as described in "Transistor Circuit Analysis" by Joyce and Clarke. The pulse from C₃ is, however, preferably applied directly to electronic switch #2, which then operates providing diode 294 is reverse biased. This diode is reverse biased only when the capacitor C₂ voltage established by the thermal converter output exceeds the reference voltage obtained from diode 297 and applied to transistor 296 making this transistor conduct and reverse biasing diode 294. This gating circuit prevents operation below preset load conditions.

When electronic switch #2 has operated, transistor 298 becomes non-conducting and maintains reverse bias on diode 300, disabling the diode 294 circuit from transistor 296 which becomes non-conducting.

Operation of electronic switch #2 switches on power amplifier #2, energizing contactor 25 and contactor 195 if switch 302 has been closed.

In one application contactor 225 actuates a solenoid valve for a governor stop setting cylinder, while contactor 195 actuates a solenoid valve for a governor position setting cylinder. Contactors 195 and 225 operate for a time interval based on the charge on capacitor C₂ and its discharge rate through resistor R₂.

In another application contactor 225 would close a circuit breaker to apply a resistance load to a power system. Similarly, contactor 195 would close a circuit breaker if switch 302 were closed. Diode 303 prevents operation of contactor 225 in response to power from the 195 contactor circuit.

In still another application one or both of these contactors would open circuit breakers dropping load from the power system, with manual reset to restore the load to the system.

When capacitor C₂ reaches a potential negative with respect to ground diode 307 becomes forward biased, restoring electronic switch #2 to normal, this opens the power amplifier #2 output circuit and contactor 225 and contactor 195 if it were closed.

Relay RY₁ opens when the capacitor 280 across its coil discharges to the drop out voltage of this relay. This discharge current is confined to the coil of relay RY₁ by virtue of diode 281. Capacitors C₁ and C₂ are then connected to the input circuit through transistor T₁.

Whereas the above described timing systems perform a timing function, it will be noted that they not only provide a means of control in which timing is influenced by transmission line transmitted power indications, but also a control which can act to inhibit initiation of the event which when it occurs is timed.

Therefore these systems do more than merely time and will be understood to have control functions independent of timing functions.

With respect to the control and timing of load application breakers 6 and 6a of FIGS. 22 and 23, what is desired is that breaker 6 close on initiation of a line fault, and then open after a preset time, while breaker 6a should close only in the event of a refault and then reopen after another preset time.

In certain applications, notably in a case in which generators in a system such as that shown in FIG. 22 are driven by waterwheels, rapid variation of generator prime mover motive power input would in most cases be impracticable, and in such event breakers 6 and 6a would be controlled without simultaneously undertaking to control prime mover driving power input.

On the other hand, when and to the extent that the generators in a system such as that shown in FIG. 22 are driven by steam or other vapor, so that rapid motive power control is feasible, it may often not be necessary or desirable to take the trouble of providing means of braking load application.

However, in general, cases may be expected to arise when both prime mover motive power control and braking load application should be employed, though in some cases it may not be necessary to apply a braking load unless there is a refault, i.e. in some cases breaker 6 would not be needed.

Whenever both prime mover motive power input and braking load are to be used in conjunction, one satisfactory method of join control is to use the same controls for both.

In relation to means of braking load application, both FIGS. 22 and 23 show dual load application circuit breakers 6 and 6a.

Actually a single breaker could be used if and when a satisfactory type, such possibly as a vacuum breaker, were available which could close and open rapidly and reliably twice in succession, so as to be able to handle both a first fault and then a refault without need for concern as to ability to recock springs in the interval between fault and refault.

On the other hand, with use of two breakers it would be possible to employ pneumatically or hydraulically cocked breakers of the type shown in FIG. 15.

FIG. 27 shows a breaker of the type of FIG. 15 provided with a control and timing systems of the type illustrated in FIGS. 25 and 26.

Thus referring to FIG. 27, trip coils 84 and 85 of breaker 6 are selectively subject to the action of double throw contactor 195 which is energized for a time interval under control of the timing system when the circuit of terminals 92 is closed during a fault, while the corresponding trip coil of breaker 6a are controlled by the action of double throw contactor 225.

This system is illustrated in FIGS. 23 and 27, as will be evidenced by reference to the lettering of the control leads connecting breakers 6 and 6a with the timing systems 202a and 202b.

It will be apparent, however, that if desired, separate control and timing systems could be used, one for prime movers and another for braking load application.

With respect to dropping receiving system load, as a means of reducing receiving and overall system deceleration, control of performance of this phase of the present invention can similarly be derived either by connection to the timing system used for receiving system prime mover control or by provision of separate controls.

In this connection FIG. 23 shows by way of illustration a choice of leads going to the load trip breakers which is adapted for use in energizing a relay in the breaker trip circuit.

FIG. 28 shows a portion of FIG. 22 modified by the inclusion of a mid bus 310 to which lines 175a, 175b, 175c and 175d connect through breakers 312a, 312b, 312c and 312d, whereas the remote ends of these lines are shown as terminating in breakers 174a and 174b at bus 173a and in breakers 174c and 174d at bus 173b.

When a mid bus is used, it is a feature of the present invention to provide means whereby a fault on either side of the bus will not only result in appropriate breaker action at either end of the faulted line, and induce an appropriate change in prime mover driving power and/or load application or removal at the remote end of the line, but will also act through a communication channel to effect an appropriate change in prime mover driving power and/or load application or removal at the remote end of the unaffected line.

Thus, referring to FIG. 28, a fault on either of lines 175a or 175b will, subject to control, operate through communication channel transmitter 313b and communication channel receiver relay 314b not only to close breakers 6 and 6a and/or act to close the steam inlet valves of the turbines driving generating segment generators 1, but also, subject to control, act to cause stability inducing activities in the receiving segment of the system such as the opening of load breakers and/or the opening of turbine generator steam inlet valves.

Similarly, a fault on either of lines 175c or 175d can operate through communication channel transmitter 313a and communication channel receiver relay 314a not only to open load breakers as breakers 178b and 178d and/or open the steam inlet valves of turbine driven receiving segment generators, but also can act to apply braking load or reduce steam input to turbine generators in the generating segment.

FIG. 29 is a more detailed illustration of a system for accomplishing the desired result. Thus, referring to FIG. 29, closure of either of both sets of auxiliary contacts 165 in relaying systems controlling the two breakers on one side of intermediate bus 310 due to a line fault on that side acts to initiate generation and transmission of communication channel energy to the bus at the remote end of the section of line on the opposite side of the bus.

The communication channel energy can be transmitted by telephone or microwave or by a separate transmission carrier channel protected by a supplementary resonant line choke, using in each case well known techniques not necessary to describe herein.

Referring to FIG. 23, the above referred to transmitted energy, however transmitted, is received at the remote ends of the line through an appropriate receiver relay unit 314 which on receipt of the transmitted signal will act to close contacts 165a which are connected in parallel with the line fault relaying system auxiliary contacts 165, and therefore are adapted to initiate prime mover driving power changes, and application of braking loads, and/or disconnecting of system loads in the same way as contacts 165.

It will be apparent that in the most general form of the present invention, both an increase in local electrical load and a reduction in driving force applied to generator prime movers in a generating segment, together with a reduction in electrical load and increase in the driving force applied to generator prime movers in a receiving segment of a power system are utilized in response to transmission line fault indication as a means of increasing stability with the net effect of reducing quantities which may be designated as the system generating segment accelerating power and the system receiving segment decelerating power relative to values which would obtain on the occurrence of a line fault in the absence of utilization of the invention, and wherein the term system generating segment accelerating power in to be understood to comprise the sum of the power inputs to the generator prime movers in the system generating segment less the sum of the generating segment transmitted and electrical loads and prime mover and generator power losses, while the receiving segment decelerating power is defined as the sum of all loads and losses in the receiving system plus the amount of power transmitted to other systems, and less the sum of the power received from the generating segment over the transmission system joining the generating segment to the receiving segment, and the sum of the receiving system prime mover input powers diminished by the prime mover and generator power losses.

A point relating to the scope of the present invention is that relative to provision of means whereby load application or removal, or prime mover motive power variation, or momentary isolation and electrical braking of generating capacity, is controlled in relation to conditions obtaining just prior to a line fault. Whereas, I have mainly shown and described control means responsive to the amount of power that was being transmitted over the transmission system of which the faulted line is a component, I am aware that alternate control factors can be made use of.

For example, in a power system involving a generating station and a transmission system, wherein all or most of the power generated in the generating station is transmitted, control may be chosen to be in response to the total of generated, rather than the total of transmitted, power.

Also, in such a power system, it would be feasible to effect control in response to the sum of approximate indications of generator prime mover power outputs, such as could be derived from the motion of prime mover valve gear, or from flowmeters measuring the flow of fluid to prime movers. Evidently, it would be feasible through the use of suitable transducers to obtain D.C. voltage outputs proportional to approximate prime mover output, and to then add these voltages and use them in place of the sum of thermal converter outputs to control the timing system of FIG. 23.

Again, in the use of transmission systems which are operated in such a way that there is a generally established relation between transmitted load and the voltages maintained at either end of the line, it will follow that there is a generally functional relationship between transmitted power and load current, and for such systems, it would be feasible to replace thermal converter output by a voltage related to line current, for example, a voltage proportional to the rectified value of such current.

Figure 30:
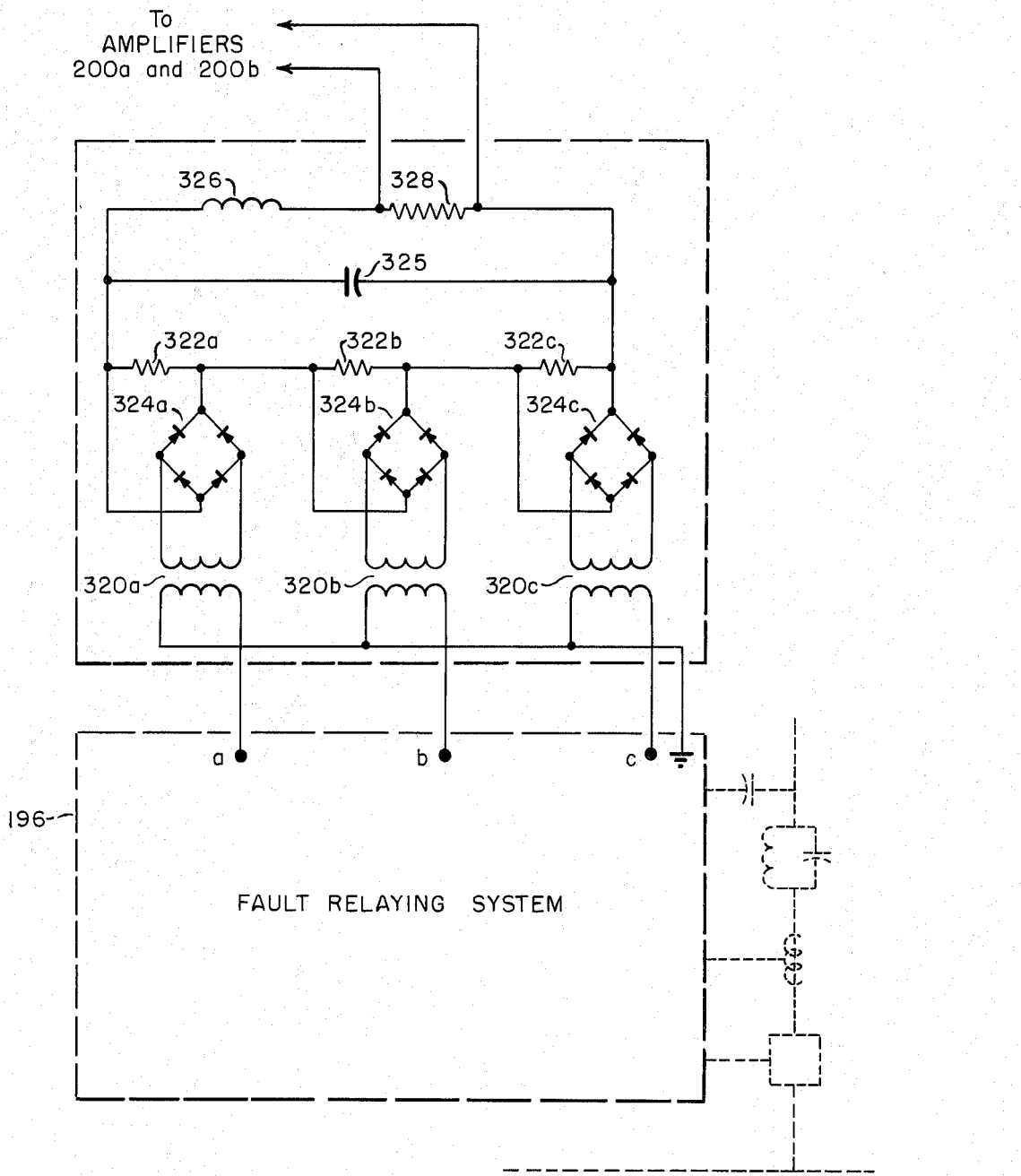

FIG. 30 shows a circuit adapted to this purpose. Referring to FIG. 30, it has been elected to show therein all three separate phases of the said circuit rather than to use a conventional one line diagram type of representation which in this case would fail to provide all needed information.

Referring to FIG. 23, it will be understood by those skilled in the art that the representation of fault relaying systems 196a and 196b therein shown implies the employment of three current transformers, one for each line phase, as well as three capacitors, one for each line phase. It will also be understood that in the employment of thermal converters, the latter receive inputs in the form of three currents proportional to line phase currents, and also three voltages proportional to line phase voltages.

In the circuit of FIG. 30, only the phase currents are utilized. Thus, in detail referring to FIG. 30, phase currents are received into the primaries of current transformers 320a through 320c from fault relaying system 196 phase current terminals a, b, and c, while current from the secondaries of these transformers traverses through resistors 322a through 322c, after first passing through rectifier networks 324a through 324c.

By virtue of the circuit arrangement, the voltages in the resistors 322a through 322c are summed and thereafter smoothed by the combined effects of capacitor 325, inductance 326 and resistance 328.

It is also an aspect of the present invention that the relative values of the last mentioned capacitance, inductance and resistance shall be selected in accordance with principles well known in the art so as to reduce ripple to a non-objectionable value and also to act to introduce appreciable time delay between changes in live current and changes in circuit D.C. output voltage.

As to the factor of delay, this must be considered in order that when a fault occurs, both a rectifier circuit and its connected amplifier output voltages will not change rapidly enough to substantially affect either the position of the pen carriages of recorders 240a and 240b of FIG. 28 or the voltages of capacitors $C_1$ and $C_2$ of FIG. 26, prior to the time relays $RY_1$ and $RY_2$ open their normally closed contacts.

On the other hand, the delay should be chosen to be only enough for the above purpose, since further delay will tend to interfere with the ability of the position of the pen carriages of FIG. 25 and of the voltages of capacitors $C_1$ and $C_2$ of FIG. 26, to have values which are adequately representative of conditions obtaining just prior to a line fault.

It is in order, also, to note that similar considerations apply in the matter of application of thermal converters in that such converters should be selected so that their response is rapid enough to produce an output voltage representative of power prevailing just prior to a line fault, but not so rapid that output voltage will be affected substantially by what occurs on the occasion of a fault prior to the opening of relays $RY_1$ and $RY_2$ of FIGS. 25 and 26.

With respect to quantitative aspects pertaining to delay, it will be desirable that in the event of a line fault, neither converter nor rectifier circuit outputs will change more than a few percent in the period that is required for the auxiliary contact 165 of the line fault relaying system to operate, and the normally closed contacts of relays $RY_1$ and $RY_2$ to open. In conventional practice, this time is normally approximately 1/20 of a second.

When provision is made as above, it is still possible to have conditions before the fault represented accurately within a small percentage, even when power and current is changing relatively rapidly prior to the fault, for example, when there is a change from one-half load to full load in a period of 1 or 2 seconds.

A further point related to the scope of the present invention is that whereas FIG. 24 shows a turbine having a single turbine steam inlet valve element acted on directly by an oil cylinder controlled by a main governor, plus an intercepting valve similarly controlled from another pre-emergency governor, in practice several individual inlet valves may be used, each actuated by a cam driven by a rack from an oil cylinder, while also other valves may be controlled from other cylinders, all under the control of a main governor, and in addition there will generally be an intercepting valve operated by a cylinder and controlled from a pre-emergency governor. However, it will be apparent to those skilled in the art that the invention as herein set forth will operate equally well whether or not single or multiple valves are used and whether or not they are operated directly or through cams.

Still another point relating to generality is the consideration that the invention should be understood to include cases wherein different transmission systems transmit power from a generating segment to different receiving systems or where a receiving system receives power over different transmission systems from different generating segments of the same or different systems.

A further point related to scope is that my invention should be considered to include systems involving segments including a segment which receives power over one transmission system and exports power over another transmission system.

Relative to the last mentioned system and segment, the interpretation is to be that for a fault on the lines bringing in power the segment in question is to be regarded as a receiving segment, whereas for a fault on the lines over which power is being exported, the said segment is to be regarded as a generating segment.

In such cases it is to be understood that my invention embraces the concept of the parallel employment of separate control and timing systems, such as are shown in FIG. 23, for each transmission system, to the extent that study indicates the desirability of employment of different control and timing for faults on such different transmission systems.

While the present invention has been described in conjunction with preferred embodiments, it is to be understood that modifications and variations may be resorted to without departing from the spirit and scope of the invent as those skilled in the art will readily understand. Such modifications and variations are considered to be within the purview and scope of the invention and the appended claims. As an illustrative example, not to be interpreted in a limiting sense, it would be obvious to those skilled in the art that application of the present invention to systems having more than one intermediate bus would require only relatively minor engineering refinements falling within the scope of the invention.

I claim:

1. A power system comprising at least one generating segment, at least one receiving segment, a transmission system coupling together said segments, thereby to carry transmitted power, means responsive to the occurrence of a fault on said transmission system for reducing decelerating power in said receiving segment, and means for controlling the degree of reduction of decelerating power by said last-mentioned means as a function of conditions obtaining in said transmission system just prior to the occurrence of said fault.

2. A power system comprising at least one generating segment, at least one receiving segment, a transmission system coupling together said segments, thereby to carry transmitted power, means responsive to the occurrence of a fault on said transmission system for reducing accelerating power in said generating segment and reducing decelerating power in said receiving segment, and means for controlling the degree of reduction of accelerating power and the degree of reduction of decelerating power by said last-mentioned means as a function of conditions obtaining in said transmission system just prior to the occurrence of said fault.

3. A power system comprising a generating segment, a receiving segment, a transmission system coupling together said segments thereby to carry transmitted power, means in said power system for monitoring and storing information representative of conditions obtaining therein, means responsive to the occurrence of a fault on said transmission system for reducing decelerating power in said receiving segment, and means for controlling the degree of reduction of said decelerating power by said last-mentioned means in relation to said information stored just prior to the occurrence of said fault.

4. A power system comprising a generating segment, a receiving segment, a transmission system coupling together said segments thereby to carry transmitted power, means in said power system for monitoring and storing information representative of conditions obtaining therein, means responsive to the occurrence of a fault on said transmission system for reducing decelerating power in said receiving segment and reducing accelerating power in said generating segment, and means for controlling the degree of reduction of decelerating power and the degree of reduction of accelerating power by said last-mentioned means in relation to said information stored just prior to the occurrence of said fault.

5. A power system comprising at least one generating segment, at least one receiving segment, a transmission system coupling together said segments thereby to carry transmitted power, normally closed circuit breaker means responsive to a fault on said transmission system for momentarily isolating said fault and reclosing after a predetermined interval, means also responsive to the occurrence of said fault for reducing accelerating power in said generating segment, means for controlling the degree of reduction of accelerating power by said last-mentioned means as a function of conditions obtaining in said transmission system just prior to the occurrence of said fault, and supplementary means responsive to the occurrence of a refault after said predetermined interval for controlling the degree of reduction of accelerating power as a function of conditions obtaining in said transmission system just prior to the occurrence of said fault.

6. A power system comprising at least one generating segment, at least one receiving segment, a transmission system coupling together said segments thereby to carry transmitted power, normally closed circuit breaker means responsive to a fault on said transmission system for momentarily isolating said fault and reclosing after a predetermined interval, means also responsive to the occurrence of said fault for reducing decelerating power in said receiving segment, means for controlling the degree of reduction of decelerating power by said last-mentioned means as a function of conditions obtaining in said transmission system just prior to the occurrence of said fault, and supplementary means responsive to the occurrence of a refault after said predetermined interval for controlling the degree of reduction of decelerating power as a function of conditions obtaining in said transmission system just prior to the occurrence of said fault.

7. A power system comprising at least one generating segment, at least one receiving segment, a transmission system coupling together said segments thereby to carry transmitted power, normally closed circuit breaker means responsive to a fault on said transmission system for momentarily isolating said fault and reclosing after a predetermined interval, means also responsive to the occurrence of said fault for reducing accelerating power in said generating segment and reducing decelerating power in said receiving segment, means for controlling the degree of reduction of accelerating and decelerating power by said last-mentioned means as a function of conditions obtaining in said transmission system just prior to the occurrence of said fault, and supplementary means responsive to the occurrence of a refault after said predetermined interval for controlling the degree of reduction of accelerating and decelerating power as a function of conditions obtaining in said transmission system just prior to the occurrence of said fault.

8. A power system comprising at least one generating segment, at least one receiving segment, a transmission system coupling together said segments thereby to carry transmitted power, normally closed circuit breaker means responsive to a fault on said transmission system for momentarily isolating said fault and reclosing after a predetermined interval, means also responsive to the occurrence of said fault for momentarily electrically loading said generating segment in a time comparable to that required for said circuit breaker to open, means for controlling the degree of said momentary electrical loading by said last-mentioned means as a function of conditions obtaining in said transmission system just prior to the occurrence of said fault, and supplementary means responsive to the occurrence of a refault after said predetermined interval for controlling the degree of electrical loading as a function of conditions obtaining in said transmission system just prior to the occurrence of said fault.

9. A power system comprising at least one generating segment which includes a prime mover, the motive power of which may be rapidly varied, at least one receiving segment, a transmission system coupling together said segments thereby to carry transmitted power, normally closed circuit breaker means responsive to a fault on said transmission system for momentarily isolating said fault and reclosing after a predetermined interval, means also responsive to the occurrence of said fault for varying said motive power applied to said prime mover, means for controlling the degree of variation of said motive power by said last-mentioned means as a function of conditions obtaining in said transmission system just prior to the occurrence of said fault, and supplementary means responsive to the occurrence of a refault after said predetermined interval for controlling the degree of variation of said motive power as a function of conditions obtaining in said transmission system just prior to the occurrence of said fault.

10. A power system comprising at least a generating segment, at least a receiving segment which includes a prime mover the motive power of which may be rapidly varied, a transmission system coupling together said segments thereby to carry transmitted power, means responsive to the occurrence of a fault on said transmission system to cause said motive power applied to said prime mover to increase, and means for controlling the degree of increase of said motive power as a function of conditions obtaining in said transmission system just prior to the occurrence of said fault.

11. A power system comprising at least a generating segment, at least a receiving segment, a transmission system coupling together said segments thereby to carry transmitted power, a plurality of normally closed circuit breakers in said receiving segment responsive in opening to the occurrence of a fault on said system, means also responsive to the occurrence of said fault for opening one or more predetermined ones of said circuit breakers in a predetermined sequence, and means for controlling the number and selection of said circuit breakers being opened in accordance with conditions obtaining in said transmission system just prior to the occurrence of said fault.

12. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for influencing the driving power of said generator prime mover, including fault responsive means independent of prime mover speed and responsive to said fault for causing said control means to increase the driving power of said generator prime mover, at least momentarily subsequent to said fault.

13. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for controlling the driving power of said generator prime mover including means responsive to prime mover speed for operating said control means, and fault responsive means independent of said speed responsive means and responsive to said fault for influencing said control means, whereby to change the speed load characteristic of said speed responsive means, at least momentarily, in a direction tending to increase prime mover driving power.

14. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for influencing the driving power of said generator prime mover, including fault responsive means independent of prime mover speed and responsive to said fault for causing said control means to increase the driving power of said generator prime mover, at least momentarily, subsequent to said fault, including means generally responsive to power transmitted over the transmission system whereby to variably influence the operation of said fault responsive means in dependence on conditions obtaining just prior to said fault.

15. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for controlling the driving power of said generator prime mover including means responsive to prime mover speed for operating said control means, and fault responsive means independent of said speed responsive means and responsive to said fault for influencing said control means, whereby to change the speed load characteristic of said speed responsive means, at least momentarily, in a direction tending to increase prime mover driving power, including means generally responsive to power transmitted over the transmission system whereby to variably control the influence of said fault responsive means in dependence on conditions obtaining just prior to said fault.

16. A power system comprising at least one generating segment, at least one receiving segment, at least one generator included in said receiving segment, at least one generator included in said generating segment, a transmission system for coupling together said segments, thereby to carry transmitted power, normally closed circuit breaker means responsive to a fault on a line of said transmission system for opening line breakers on either side of said fault, acceleration reducing means for controlling the acceleration of said generating segment subsequent to a fault, including fault responsive means independent of prime mover speed and responsive to said fault, for causing said acceleration reducing means to reduce the acceleration of said generating segment subsequent to said fault, means for automatically reclosing the said line breakers and supplementary fault responsive means responsive to the occurrence of a refault for influencing the operation of said acceleration reducing means subsequent to said refault.

17. A power system comprising at least one generating segment, at least one receiving segment, at least one generator included in said receiving segment, at least one generator included in said generating segment, a prime mover for driving said generating segment generator, a transmission system for coupling together said segments, whereby to carry transmitted power, normally closed circuit breaker means responsive to a fault on a line of said primary transmission system, for opening line breakers on either side of said fault, control means for controlling the driving power of said prime mover and including means responsive to prime mover speed for operating said control means, and fault responsive means independent of said speed responsive means, and responsive to said fault for influencing said control means, whereby to change the speed load characteristic of said speed responsive means, at least momentarily, in a direction tending to reduce prime mover driving power, means for automatically reclosing said line breakers, and supplementary fault responsive means responsive to the occurrence of a refault for influencing said control means subsequent to said refault.

18. A power system comprising at least one generating segment, at least one receiving segment, at least one generator included in said receiving segment, at least one generator included in said generating segment, a transmission system for coupling together said segments, thereby to carry transmitted power, normally closed circuit breaker means responsive to a fault on a line of said transmission system for opening line breakers on either side of said fault, acceleration reducing means for controlling the acceleration of said generating segment subsequent to a fault, including fault responsive means independent of prime mover speed and responsive to said fault, for causing said acceleration reducing means to reduce the acceleration of said generating segment subsequent to said fault, means for automatically reclosing the said line breakers and supplementary fault responsive means responsive to the occurrence of a refault for influencing the operation of said acceleration reducing means subsequent to said refault, including means generally responsive to power transmitted over the transmission system whereby to variably influence the operation of said supplementary fault responsive means in dependence on conditions obtaining just prior to said fault.

19. A power system comprising at least one generating segment, at least one receiving segment, at least one generator included in said receiving segment, at least one generator included in said generating segment, a prime mover for driving said generating segment generator, a transmission system for coupling together said segments, thereby to carry transmitted power, normally closed circuit breaker means responsive to a fault on a line of said primary transmission system, for opening line breakers on either side of said fault, control means for controlling the driving power of said prime mover and including means responsive to prime mover speed for operating said control means, and fault responsive means independent of said speed responsive means, and responsive to said fault for influencing said control means, whereby to change the speed load characteristic of said speed responsive means, at least momentarily, in a direction tending to reduce prime mover driving power, means for automatically reclosing said line breakers, and supplementary fault responsive means responsive to the occurrence of a refault for influencing said control means subsequent to said refault, including means generally responsive to power transmitted over the transmission system whereby to variably influence the operation of said supplementary fault responsive means in dependence on conditions obtaining just prior to said fault.

20. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for influencing the driving power of said generator prime mover, including fault responsive means independent of prime mover speed and responsive to said fault for causing said control means to increase the driving power of said generator prime mover, at least momentarily, subsequent to said fault, means for automatically reclosing the said line breakers and supplementary fault responsive means responsive to the occurrence of a refault for influencing said control means subsequent to said refault.

21. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for controlling the driving power of said generator prime mover including means responsive to prime mover speed for operating said control means, and fault responsive means independent of said speed responsive means and responsive to said fault for influencing said control means, whereby to change the speed load characteristic of said speed responsive means, at least momentarily, in a direction tending to increase prime mover driving power, means for automatically reclosing said line breakers, and supplementary fault responsive means responsive to the occurrence of a refault for influencing said control means subsequent to said refault.

22. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for influencing the driving power of said generator prime mover, including fault responsive means independent of prime mover speed and responsive to said fault for causing said control means to increase the driving power of said generator prime mover, at least momentarily, subsequent to said fault, means for automatically reclosing the said line breakers and supplementary fault responsive means responsive to the occurrence of a refault for influencing said control means subsequent to said refault, including means generally responsive to power transmitted over the primary transmission system whereby to variably control the influence of said supplementary fault responsive means in dependence on conditions obtaining just prior to said fault.

23. A power system comprising at least one generating segment incorporating at least one generator, at least one receiving segment, at least one generator included in said receiving segment, a prime mover for driving said receiving segment generator, a transmission system for coupling together said segments, thereby to carry transmitted power, normally closed circuit breaker means responsive to a fault on a line of said transmission system for opening line breakers on either side of said fault, control means for controlling the driving power of said generator prime mover including means responsive to prime mover speed for operating said control means, and fault responsive means independent of said speed responsive means and responsive to said fault for influencing said control means, whereby to change the speed load characteristic of said speed responsive means, at least momentarily, in a direction tending to increase prime mover driving power, means for automatically reclosing said line breakers, and supplementary fault responsive means responsive to the occurrence of a refault for influencing said control means subsequent to said refault, including means generally responsive to power transmitted over the transmission system whereby to variably control the influence of said supplementary fault responsive means in dependence on conditions obtaining just prior to said fault.

24. A power system comprising at least one generating segment, at least one receiving segment including at least one prime mover driven generator, a transmission system including at least a line coupling together said segments thereby to carry transmitting power, means for controlling the driving power of said prime mover and means responsive to the occurrence of a fault on a line of said transmission system for increasing the driving power of said prime mover.

25. A power system comprising at least one generating segment, at least one receiving segment including at least one prime mover driven generator, a transmission system coupling together said segments thereby to carry transmitted power, means responsive to the occurrence of a fault on said transmission system for reducing accelerating power in said generating segment and prime mover motive power control means for reducing decelerating power in said receiving segment, and means for controlling the degree of reduction of accelerating power and the degree of reduction of decelerating power by said last-mentioned means as a function of conditions obtaining in said transmission system just prior to the occurrence of said fault.

26. A power system comprising at least one generating segment, at least one receiving segment including at least one generator, a transmission system coupling together said segments thereby to carry transmitted power, normally closed circuit breaker means responsive to a fault on said transmission system for momentarily isolating said fault, means for subsequently reclosing certain of said circuit breaker means, means also responsive to the occurrence of said fault for reducing accelerating power in said generating segment, means for controlling the degree of reduction of accelerating power by said last-mentioned means, and supplementary means responsive to the occurrence of a refault for controlling the degree of reduction of accelerating power.

27. A power system comprising at least one generating segment, at least one receiving segment including at least one generator, a prime mover for driving said generator, a transmission system including at least a line coupling together said segments thereby to carry transmitting power, means independent of the speed of said prime mover and responsive to the occurrence of a fault on a line of said transmission system for increasing the driving power of said prime mover and means for controlling the degree of increase of prime mover driving power by said last-mentioned means as a function of conditions obtaining in said transmission system just prior to the occurrence of said fault.

References Cited by the Examiner
UNITED STATES PATENTS

| 2,243,561 | 5/1941 | Hanna | 317—19 |
| 2,314,587 | 3/1943 | Lillquist | 317—19 |

LLOYD McCOLLUM, *Primary Examiner.*